United States Patent
Adair et al.

(12) 
(10) Patent No.: US 11,086,296 B2
(45) Date of Patent: Aug. 10, 2021

(54) ADDITIVE MANUFACTURING TOOL

(71) Applicant: Hurco Companies, Inc, Indianapolis, IN (US)

(72) Inventors: David C. Adair, Indianapolis, IN (US); Frederick W. Gross, Carmel, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 756 days.

(21) Appl. No.: 15/861,767

(22) Filed: Jan. 4, 2018

(65) Prior Publication Data

US 2019/0204811 A1    Jul. 4, 2019

(51) Int. Cl.
| | |
|---|---|
| *B33Y 30/00* | (2015.01) |
| *B29C 64/118* | (2017.01) |
| *G05B 19/414* | (2006.01) |
| *B23Q 11/08* | (2006.01) |
| *B24B 55/02* | (2006.01) |
| *B29C 33/38* | (2006.01) |
| *B23K 26/08* | (2014.01) |

(Continued)

(52) U.S. Cl.
CPC ...... *G05B 19/4145* (2013.01); *B23K 26/0884* (2013.01); *B23K 26/1482* (2013.01); *B23Q 11/0883* (2013.01); *B24B 55/02* (2013.01); *B29C 33/3835* (2013.01); *B29C 48/266* (2019.02); *B29C 64/118* (2017.08); *B29C 64/209* (2017.08); *B33Y 30/00* (2014.12)

(58) Field of Classification Search
CPC .................................................. B29C 64/118
See application file for complete search history.

(56) References Cited

U.S. PATENT DOCUMENTS 5,914,881 A     6/1999  Trachier
5,968,561 A  * 10/1999  Batchelder .............. B29C 41/36
                                                              425/375

(Continued)

FOREIGN PATENT DOCUMENTS

| CN | 102323432 | 1/2012 |
|---|---|---|
| DE | 4422146 A1 | 1/1996 |
| WO | WO2014/013247 | 1/2014 |

OTHER PUBLICATIONS

2BEIGH3 Combination CNC Machine and 3D Printer, instructables, Sep. 12, 2012, pp. 1-51.

(Continued)

*Primary Examiner* — Jeffrey M Wollschlager
*Assistant Examiner* — Armand Melendez
(74) *Attorney, Agent, or Firm* — Faegre Drinker Biddle & Reath LLP

(57) ABSTRACT

An additive manufacturing tool configured to couple to a spindle of a CNC machine, comprises a plurality of drive wheels movable between an engaged position wherein they compress filament from a filament source against a drive disc and a disengaged position wherein they are spaced apart from the filament, and a delivery assembly including a heating element and a nozzle having an outlet opening. When the plurality of drive wheels are in the engaged position and the drive disc is rotated, the filament is drawn into the tool from the filament source and routed around the drive disc to the nozzle, where heat transferred from the heating element to the nozzle melts the filament so that the filament flows through the outlet opening.

33 Claims, 38 Drawing Sheets

(51) Int. Cl.
*B23K 26/14* (2014.01)
*B29C 48/25* (2019.01)
*B29C 64/209* (2017.01)

(56) References Cited

U.S. PATENT DOCUMENTS

| | | | |
|---|---|---|---|
| 6,022,207 A | 2/2000 | Dahlin et al. | |
| 6,119,497 A | 9/2000 | Eisele | |
| 6,129,872 A * | 10/2000 | Jang | B29C 48/17 264/75 |
| 6,666,630 B2 | 12/2003 | Zimmermann et al. | |
| 7,291,002 B2 | 11/2007 | Russell et al. | |
| 7,744,801 B2 | 6/2010 | Owada | |
| 8,406,508 B2 | 3/2013 | Pollack et al. | |
| 8,556,373 B2 | 10/2013 | Buestgens et al. | |
| 8,604,381 B1 | 12/2013 | Shin | |
| 2008/0100251 A1 | 5/2008 | Xu | |
| 2009/0234490 A1 | 9/2009 | Suprock et al. | |
| 2010/0161105 A1 | 6/2010 | Blake | |
| 2010/0171275 A1 | 7/2010 | Nguyen | |
| 2013/0287933 A1 | 10/2013 | Kaiser et al. | |
| 2013/0295338 A1 | 11/2013 | Keating et al. | |
| 2014/0054817 A1 | 2/2014 | Jaffe | |
| 2014/0265040 A1 * | 9/2014 | Batchelder | G01F 1/661 264/409 |
| 2014/0271964 A1 | 9/2014 | Roberts, IV et al. | |
| 2015/0005919 A1 | 1/2015 | McGatha et al. | |
| 2015/0140145 A1 | 5/2015 | Schmehl | |
| 2015/0145177 A1 | 5/2015 | El-Siblani et al. | |
| 2015/0165690 A1 | 6/2015 | Tow | |
| 2015/0209925 A1 | 7/2015 | Dodds | |
| 2015/0298393 A1 * | 10/2015 | Suarez | B33Y 70/00 425/3 |
| 2015/0335451 A1 | 11/2015 | Liu et al. | |
| 2015/0360317 A1 | 12/2015 | Kalvala et al. | |
| 2017/0157826 A1 * | 6/2017 | Hishiki | B29C 48/2888 |
| 2019/0193331 A1 * | 6/2019 | Welling | B29C 64/118 |
| 2020/0086424 A1 * | 3/2020 | Jones | B33Y 30/00 |

OTHER PUBLICATIONS

Holloway, J., License to mill: Mebotics' Microfactory combines 3D printer and milling machine, obtained from the Internet http://www.oizmao.com/mebotics-microfactory/29065/ on Mar. 19, 2014, pp. 1-6.

Optomec to Launch LENS Print Engine for 3D Printed Metals at Additive Manufacturing Conference, Fort Mill Times, Mar. 11, 2014, pp. 1-2.

Hewitt, J., This awesome 'replicator' combines industrial machining with laser 3D printing to create just about anything, extremetech electronics, Jan. 23, 2014, pp. 1-5.

Carsten, "Conversion CNC Milling Machine to 3D Printer? (Temporary)", obtained from the Internet on Nov. 27, 2017 at https://www.mikrocontroller.net/topic/315745 German language, 5 pages.

Carsten, "Conversion CNC Milling Machine to 3D Printer? (Temporary)", obtained from the Internet on Nov. 27, 2017 at https://translate.google.com/translate?hl=en&sl=de&u=https://www.mikrocontroller.net/topic/315745&prev=search, Google translation to English, 9 pages.

* cited by examiner

ADDITIVE MANUFACTURING TOOL

FIELD OF THE DISCLOSURE

The present disclosure relates generally to an additive manufacturing tool and more particularly, to a tool configured to couple to a spindle of a CNC machine, draw a filament through the tool, heat the filament in a nozzle and deliver extruded material from the nozzle to form a part.

BACKGROUND

CNC machines are widely used in industry for manufacturing components or parts. CNC machines are advantageous because they utilize computer-aided design ("CAD") and computer-aided manufacturing ("CAM") programs to manufacture components to exact specifications in continuous, automated processes. The production of a component from a blank or a raw material might require the use of different cutting tools such as milling tools, radius bits and drills. Therefore, CNC machines also allow for the interchangeability of tools during a continuous, automated manufacturing process for a part or component.

One use of CNC machines is subtractive manufacturing, or processes where parts of a blank or raw material are removed, for example, by milling, drilling, and grinding. For additive manufacturing, or the process of adding material in certain shapes to create a part or component, the use of three-dimensional ("3D") printing has increased in both industrial and consumer applications. 3D printing uses extruded materials, oftentimes plastics, for depositing material to create free-standing parts, or to add components to a pre-existing part. However, 3D printers are expensive and provide only small work volumes in which a part can be manufactured.

Thus, a self-contained additive manufacturing tool that is interchangeable as a tool with a pre-existing CNC machine would be desirable. A CNC machine would provide a larger 3D work volume in which a part could be produced, and such an interchangeable would reduce the need to buy a separate 3D printing device.

SUMMARY

In one embodiment, the present disclosure provides an additive manufacturing tool configured to couple to a spindle of a computer numerical control ("CNC") machine, the tool comprising: a plurality of drive wheels being movable between an engaged position wherein the plurality of drive wheels compress filament from a filament source against a drive disc and a disengaged position wherein the plurality of drive wheels are spaced apart from the filament; and a delivery assembly including a heating element and a nozzle having an outlet opening; wherein when the plurality of drive wheels are in the engaged position and the drive disc is rotated, the filament is drawn into the tool from the filament source and routed around the drive disc to the nozzle, where heat transferred from the heating element to the nozzle melts the filament so that the filament flows through the outlet opening. In one aspect of this embodiment, the filament enters the tool in a first direction and passes through the nozzle in a second direction, the second direction being substantially perpendicular to the first direction. A variant of this aspect further comprises a material inlet assembly including a filament tube that routes filament into the tool in the first direction. In another aspect, the plurality of drive wheels are mounted to a corresponding plurality of axle members, the plurality of axle members being movable between a lowered position which places the drive wheels in the engaged position and a raised position which places the drive wheels in the disengaged position. A variant of this aspect further comprises a lever coupled to a cam, the lever being movable from an inactive position wherein the plurality of axle members are in the lowered position and engage a recessed surface of the cam and an active position wherein the lever rotates the cam such that the plurality of axle members engage an outer edge of the cam, thereby moving the plurality of axle members into the raised position and the plurality of drive wheels into the disengaged position. A further variant further comprises a guide pin that extends through a slot in the lever and into the cam, wherein movement of the lever toward the active position moves the slot relative to the cam and causes the guide pin to rotate the cam. Another variant further comprises a forward drive plate having a cam boss, a plurality of bolts each extending through one of the plurality of axle members and threaded into a threaded opening in the cam boss, and a plurality of springs each disposed between one of the plurality of bolts and one of the plurality of axle members to bias the one of the plurality of axle members toward the lowered position. Yet another variant further comprises a spring coupled to the lever to bias the lever toward the inactive position. Another aspect of this embodiment further comprises a stepper motor, a drive gear coupled to the stepper motor, a follower gear that meshes with the drive gear, and a shaft coupled to the follower gear for rotation therewith, the drive disc being coupled to the shaft, wherein operation of the stepper motor causes rotation of the drive gear in a first direction, which causes rotation of the follower gear, the shaft and the drive disc in a second direction that is opposite the first direction. Another aspect further comprises a tool holder configured to couple to a tool coupler of the spindle, and an anti-rotate pin configured to couple to a stop block attached to the spindle to prevent rotation of the tool when the spindle rotates. Yet another aspect further comprises a dock connector that mates with a connector coupled to the spindle to provide power and control signals to the tool. Another aspect further comprises a pair of bearings, the drive disc rotating on a shaft that is supported by the pair of bearings. Still another aspect further comprises a heated inlet assembly including an inlet nozzle configured to receive filament from the filament source and an inlet heating element disposed adjacent the inlet nozzle to provide heat to the inlet nozzle and thereby preheat the filament before the filament is routed around the drive disc.

In another embodiment, the present disclosure provides a system for additive manufacture of a part, comprising: a computer numerical control ("CNC") machine, wherein the CNC machine includes a spindle and a controller; an additive manufacturing tool that provides extruded material to form a part in a workspace of the CNC machine, the additive manufacturing tool including: a plurality of wheel drive assemblies, a plurality of drive wheels coupled to the plurality of wheel drive assemblies for movement between an engaged position and a disengaged position, a motor-driven drive disc, and a delivery assembly including a heating element; wherein the additive manufacturing tool is coupled to the spindle and controlled by the controller, the controller causing the motor-driven drive disc to rotate, which when the plurality of drive wheels are in the engaged position, draws filament into the additive manufacturing tool, around the motor-driven drive disc and into the delivery assembly where heat transferred from the heating element converts the filament into extruded material deposited from the additive manufacturing tool to form the part. In one aspect of this embodiment, when the plurality of drive wheels are in the engaged position, the plurality of drive wheels compress the filament against the drive disc. In another aspect, the filament enters the tool in a first direction and passes through a nozzle of the delivery assembly in a second direction, the second direction being substantially perpendicular to the first direction. In a variant of this aspect, the additive manufacturing tool further comprises a material inlet assembly including a filament tube that routes filament into the tool in the first direction. In another aspect, each of the plurality drive wheel assemblies includes an axle member coupled to one of the plurality of drive wheels, each axle member being movable between a lowered position which places the corresponding drive wheel in the engaged position and a raised position which places the corresponding drive wheel in the disengaged position. In a variant of this aspect, the additive manufacturing tool further comprises a lever coupled to a cam, the lever being movable from an inactive position wherein the plurality of axle members are in the lowered position and engage a recessed surface of the cam and an active position wherein the lever rotates the cam such that the plurality of axle members engage an outer edge of the cam, thereby moving the plurality of axle members into the raised position and the plurality of drive wheels into the disengaged position. In a further variant, the additive manufacturing tool further comprises a guide pin that extends through a slot in the lever and into the cam, wherein movement of the lever toward the active position moves the slot relative to the cam and causes the guide pin to rotate the cam. In yet another variant, the additive manufacturing tool further comprises a spring coupled to the lever to bias the lever toward the inactive position. In another aspect of this embodiment, each of the plurality of wheel drive assemblies includes an axle member, a spring and a bolt, the bolt extending through the spring and the axle member and into a threaded opening of a cam boss, the spring being disposed between the bolt and the axle member to bias the axle member toward a lowered position. In another aspect, the additive manufacturing tool further comprises a stepper motor, a drive gear coupled to the stepper motor, a follower gear that meshes with the drive gear, and a shaft coupled to the follower gear for rotation therewith, the drive disc being coupled to the shaft, and wherein the controller controls operation of the stepper motor to rotate the drive gear, the follower gear, the shaft and the motor-driven drive disc. In yet another aspect, the additive manufacturing tool further comprises a tool holder configured to couple to a tool coupler of the spindle, and an anti-rotate pin configured to couple to a stop block attached to the spindle to prevent rotation of the tool when the spindle rotates. In still another aspect, the additive manufacturing tool further comprises a heated inlet assembly including an inlet nozzle configured to receive filament from a filament source and an inlet heating element disposed adjacent the inlet nozzle to provide heat to the inlet nozzle and thereby preheat the filament before the filament is routed around the motor-driven drive disc.

In yet another embodiment, the present disclosure provides a method of additive manufacture of a part, comprising: providing an additive manufacturing tool; supplying filament to the additive manufacturing tool in a first direction; moving the filament through the additive manufacturing tool using a drive disc to a delivery assembly of the additive manufacturing tool; heating the filament in the delivery assembly to form extruded material; and delivering the extruded material through the delivery assembly in a second direction to form the part, the second direction being substantially perpendicular to the first direction. In one aspect of this embodiment, moving the filament through the additive manufacturing tool includes routing the filament between the drive disc and a plurality of drive wheels that urge the filament against the drive disc when the plurality of drive wheels are in an engaged position. In a variant of this aspect, the additive manufacturing tool includes a lever coupled to the plurality of drive wheels to move the plurality of drive wheels between the engaged position and a disengaged position, wherein the plurality of drive wheels are spaced apart from the filament so that the filament can be removed from the additive manufacturing tool. In another variant, the plurality of drive wheels are biased toward the engaged position by a corresponding plurality of springs.

In still another embodiment, the present disclosure provides an additive manufacturing tool configured to couple to a spindle of a computer numerical control ("CNC") machine, the tool comprising: a plurality of drive wheels being movable between an engaged position wherein the plurality of drive wheels compress filament from a filament source against a drive disc and a disengaged position wherein the plurality of drive wheels are spaced apart from the filament; a delivery assembly including a heating element and a nozzle having an outlet opening; and a heated inlet nozzle configured to provide filament from the filament source to the drive wheels; wherein when the plurality of drive wheels are in the engaged position and the drive disc is rotated, the filament is drawn into the tool from the filament source and routed to the nozzle, where heat transferred from the heating element to the nozzle melts the filament so that the filament flows through the outlet opening; and wherein the nozzle and the heated inlet nozzle are configured to be replaced with other nozzles and heated inlet nozzles to accommodate filaments of different diameters.

In still another embodiment, the present disclosure provides an additive manufacturing tool configured to couple to a spindle of a computer numerical control ("CNC") machine, the tool comprising: a heated inlet nozzle configured to receive a filament from a filament source; a delivery nozzle for providing melted filament to form a part; and a drive assembly for delivering the filament from the heated inlet nozzle to the delivery nozzle; wherein the heated inlet assembly preheats the filament to increase flexibility of the filament.

BRIEF DESCRIPTION OF THE DRAWINGS

The above-mentioned aspects of the present teachings and the manner of obtaining them will become more apparent, and the teachings will be better understood by reference to the following description of the embodiments taken in conjunction with the accompanying drawings, wherein.

DETAILED DESCRIPTION OF THE DRAWINGS

The embodiments disclosed herein are not intended to be exhaustive or to limit the invention to the precise form disclosed in the following detailed description. Rather, the embodiments were chosen and described so that others skilled in the art may utilize their teachings.

Figure 1:
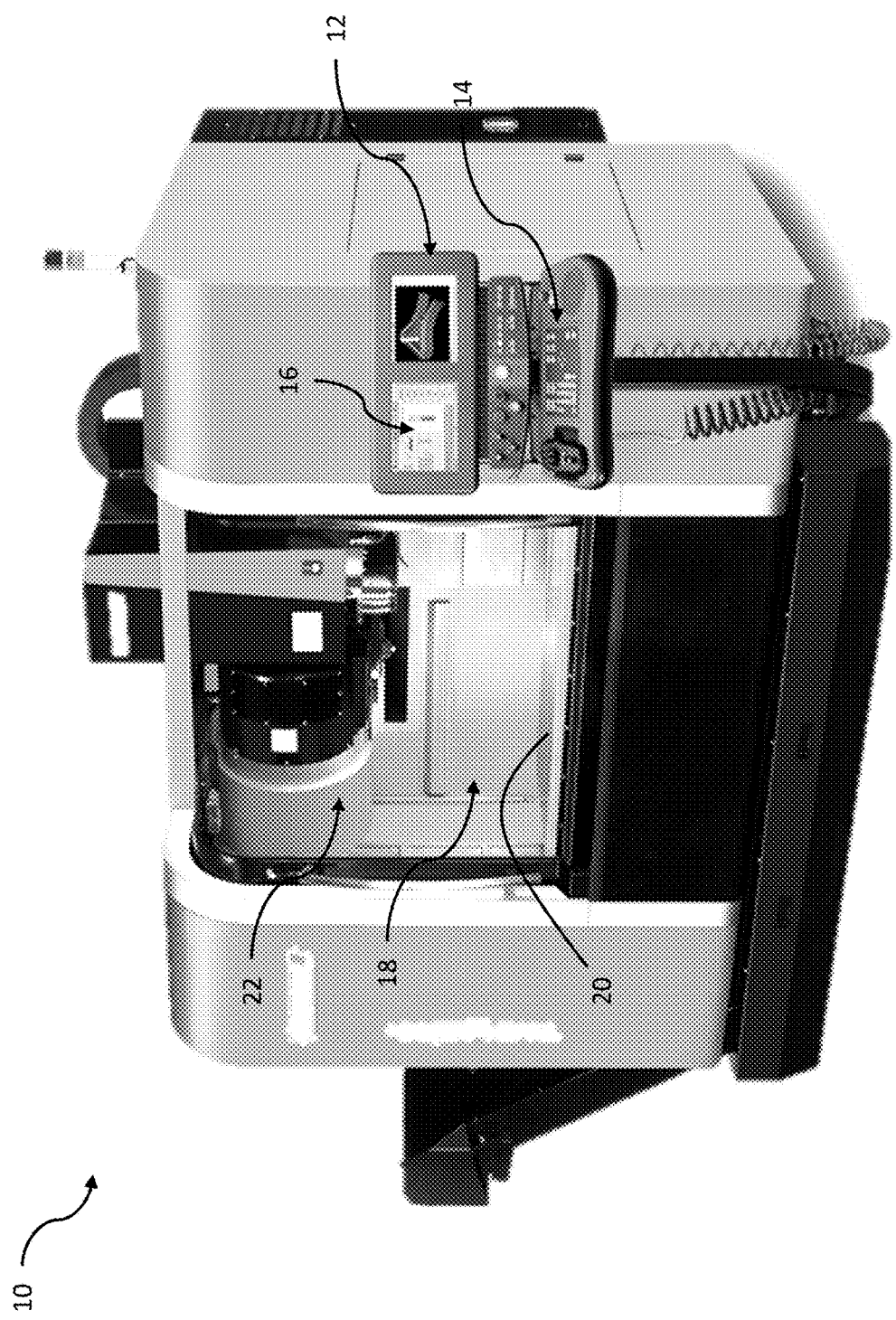
FIG. 1 is a front view of a CNC machine with a control console.

Referring first to FIG. 1, a front view of a CNC machine 10 is shown. CNC machine 10 includes a control console or controller 12 with user controls 14 and at least one viewable screen 16. In one embodiment, controls 14 and viewable screen 16 allow a user to generate part programs using conventional methods including accessing computer-aided design ("CAD") and computer-aided manufacturing ("CAM") programs. CAD and CAM programs allow for manufacture of components to meet exact specifications in continuous, automated processes. These processes may include both additive and subtractive manufacturing. In the center of CNC machine 10, a workspace 18 is shown.

Workspace 18 has a flat working surface 20, so that a user can mount a blank or raw material on working surface 20 to be worked upon by CNC machine 10. When CNC machine 10 is operational, workspace 18 is closed by a door or screen. In some embodiments, workspace 18 remains closed during a continuous, automated manufacturing program. The program can begin after a blank or raw material is mounted to working surface 20 and the door or screen is closed, and end after the program has created a part by controlling the operation of the machine 10 according to user input specifications. The continuous, automated manufacturing program of the present disclosure can be a subtractive manufacturing program, an additive manufacturing program, or a combination of both subtractive and additive manufacturing. As described below, a plurality of working parts 22 are disposed in workspace 18 including a spindle and a plurality of axes (linear and/or tilt) controlled by servo motors.

Subtractive manufacture includes, but is not limited to, grinding, drilling, boring, shaving, milling, and cutting. Additive manufacture includes, but is not limited to, extruding or depositing, which oftentimes is carried out using moldable and flowable plastics. Other materials to be used in an additive manufacturing program might include rubber, metals, epoxies, glue, or composite materials. In some embodiments, a user does not mount any blank or raw material to working surface 20, and workspace 18 is closed, beginning an additive and subtractive manufacturing program. According to embodiments of the disclosure, the material for additive manufacture can be contained entirely within workspace 18 before, during, and after a manufacturing process. Additive and subtractive manufacture, in some embodiments, further includes heating, cooling, and/or curing material, optionally with lasers, UV lights, and/or fluid streams within workspace 18. It should be understood that by providing an additive manufacturing tool as described herein, the present disclosure provides more flexibility to the capabilities of CNC machine 10 and to increase service offerings. It provides the ability to make prototype parts from less expensive material instead of machining from expensive pieces of metal. The additive manufacturing tool also makes it possible to add a different material to a part, such as by adding a plastic logo or a flexible plastic seal to a machined metal part.

Still referring to FIG. 1, working parts 22 (described in more detail with reference to FIG. 2 below) of CNC machine 10 are programmed to move according to a user input to create a specific shape. As indicated above, working parts 22 include a spindle and spindle head (described in more detail below). During a continuous, automated manufacturing program, working parts 22 move within workspace 18 to create a part or component. In one embodiment, working parts 22 are coupled with cutting tools in a subtractive manufacturing program. In other embodiments, working parts 22 are coupled with an additive manufacturing tool as described herein during an additive manufacturing process. In one embodiment, during a continuous, automated manufacturing program using both additive and subtractive manufacturing to create a component, working parts 22 interchangeably couple with subtractive manufacturing tools, such as a milling tool, and the present additive manufacturing tool.

The terms "couple" and "coupling" as used herein refer to any connection for machine parts known in the art including, but not limited to, connections with bolts, screws, threads, magnets, electro-magnets, adhesives, frictions grips, welds, snaps, clips, etc.

Figure 2:
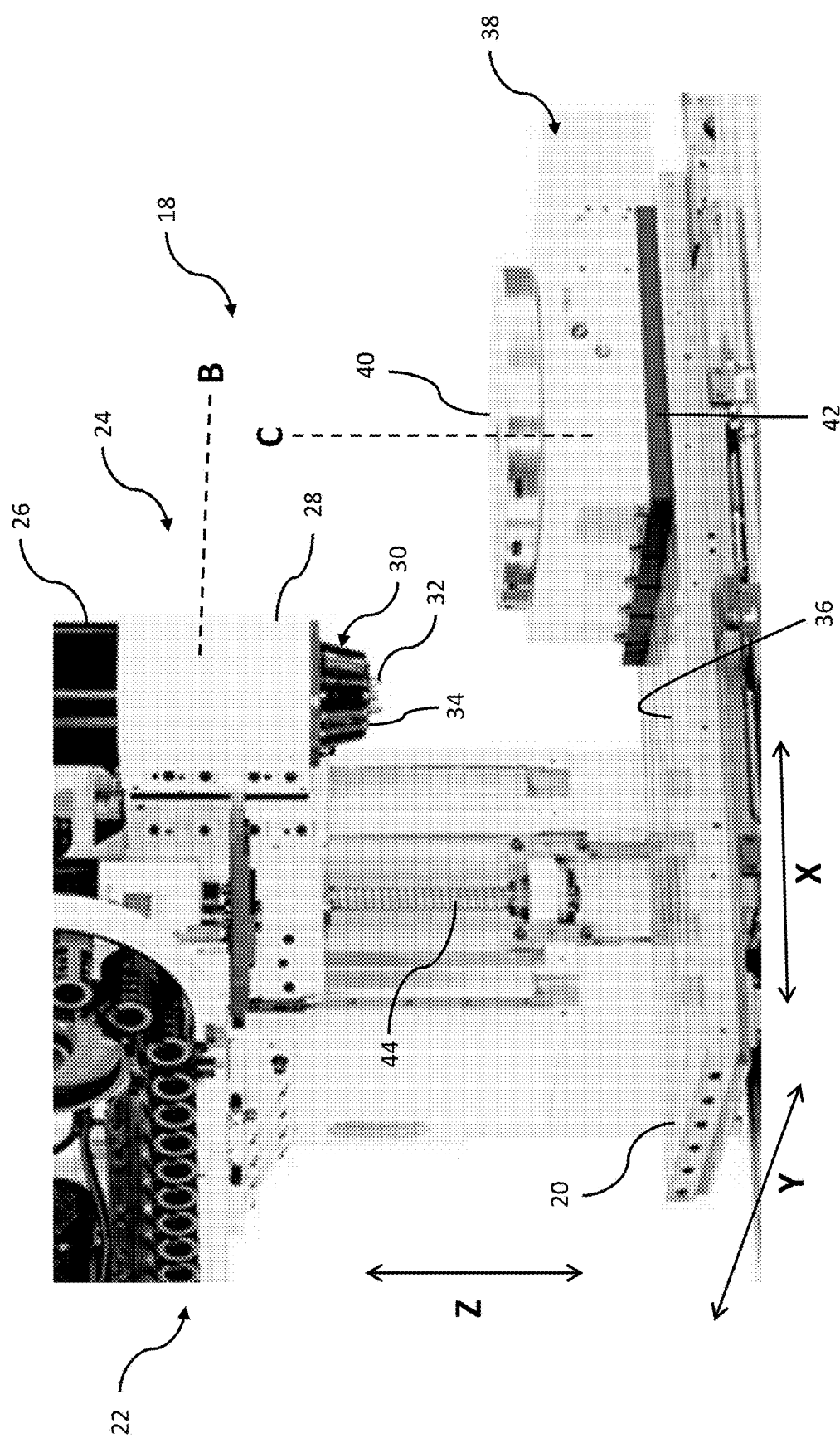
FIG. 2 is a perspective view of a workspace of a CNC machine with a spindle head.
Figure 3:
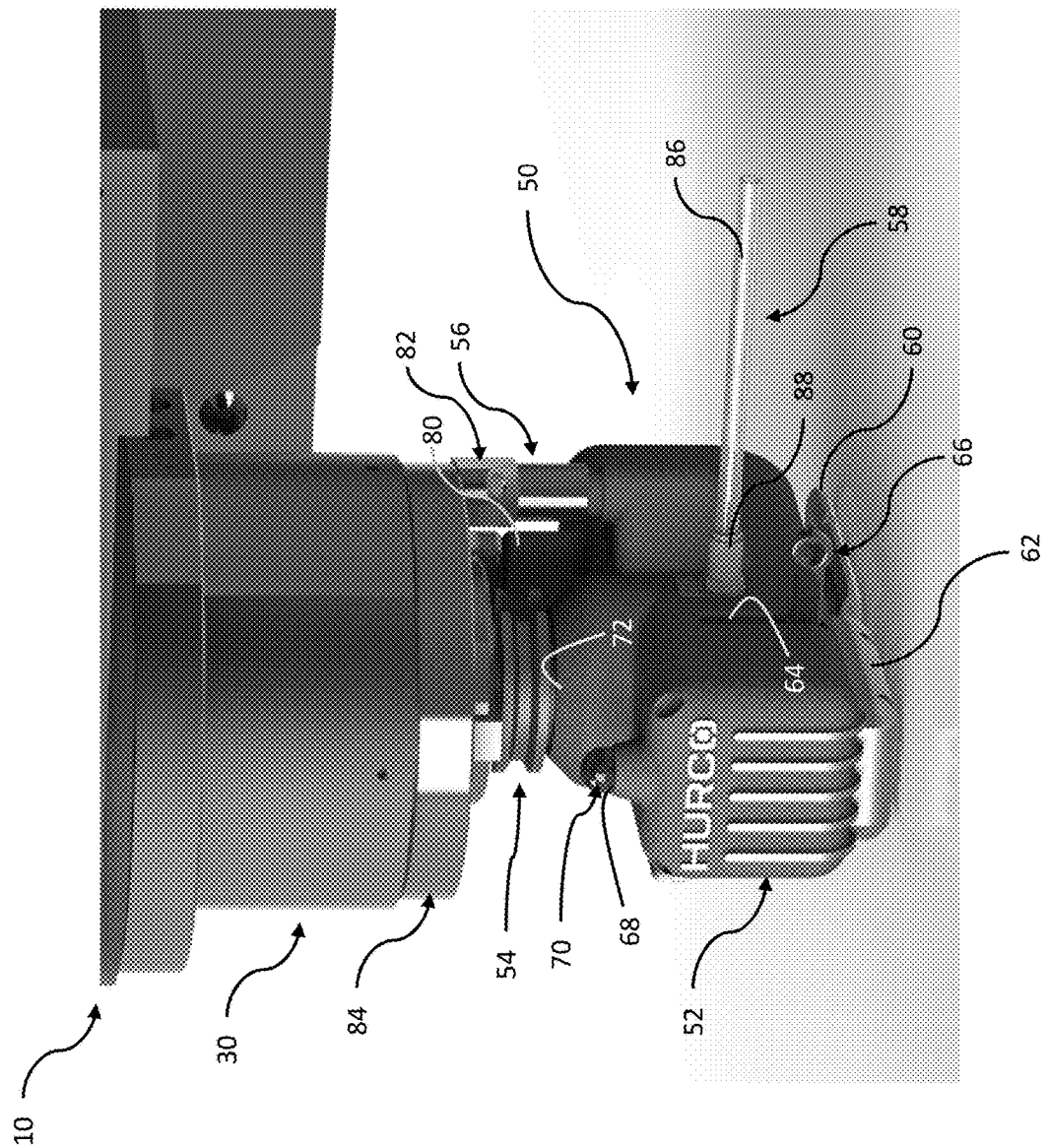
FIGS. 3-6 are perspective views of an additive manufacturing tool according to one embodiment of the present disclosure, attached to a spindle head.

Referring now to FIG. 2, a perspective view of workspace 18 in CNC machine 10 is shown. In the embodiment shown, workspace 18 is the workspace of a 5-axis CNC machine tool, and the axes are described further below. The teachings of the present disclosure are also applicable to other multi-axis CNC machines. Working parts 22 include a spindle head 24 having a motor housing 26, a head casting 28, a spindle 30 and coupling keys 32. Spindle 30 has a lower flat surface 34, and keys 32 extend downwardly below surface 34 to engage tools as is further described below. In the embodiment shown, there are two coupling keys; however, more or fewer coupling keys are contemplated. Any combination of a spindle and keys known in the art capable of coupling interchangeably with a holder, specifically a tool holder (described in more detail below) is envisioned. Spindle 30 and keys 32 are able to interchangeably couple with subtractive manufacturing tools, such as drill bits, and additive manufacturing tools such as the additive manufacturing tool described herein.

Still referring to FIG. 2, working surface 20 has grooves 36 and an optional working table 38. Grooves 36 facilitate affixing material to be machined, or affixing a fixture, such as working table 38, or other material holders to working surface 20. Working table 38 has a flat upper surface 40 and a groove-fitting lower surface 42. Upper surface 40 allows for a blank or piece of raw material (i.e., a workpiece) to be mounted to working table 38 for either additive or subtractive manufacture by spindle head 24 and a tool (not shown) coupled to spindle 30 by keys 32. Working table 38 is affixed to working surface 20 within grooves 36. Therefore, when working surface 20 moves in the X and Y directions, working table 38, or other affixed units, move with working surface 20. Flat upper surface 40 rotates about a rotary C axis, and spindle head 24 rotates about a rotary B axis.

Working parts 22 include a ball screw 44, which facilitates movement of spindle head 24 along the Z axis during a manufacturing process. Spindle head 24 can rotate about the B axis to allow a tool to work on a part mounted on upper surface 20 from different angles during a manufacturing process. Additionally, working surface 20 can move along the X axis and spindle head 24 can move along the Y axis during a manufacturing process. The described movement of the parts relative to the X, Y, Z, B and C axes, in one embodiment, is controlled to achieve tool paths required for forming a part having a geometry specified according to user input in a part program. It should be understood that while the disclosure refers to a five-axis CNC machine, the teachings of the present disclosure are applicable to CNC machines having more or fewer than five axes.

Referring now to FIGS. 3-6, an additive manufacturing tool 50 according to the present disclosure is shown coupled to spindle 30 of CNC machine 10. Tool 50 generally includes a housing 52, a tool holder 54, an anti-rotate pin 56, a material inlet assembly 58, a mount 60 and a fan shroud 62. Housing 52 includes a slot 64 to receive a lever 66 which functions as a clutch as described below, an upper opening 68 to receive an indicator 70 (which is illuminated when power is applied to tool 50), a shank opening 72 to receive tool holder 54, a side opening 74 (FIG. 4) to accommodate an air inlet 76 (FIG. 4), a plurality of fan outlet vents 78 (FIG. 4), and a dock connector 80. Air inlet 76 is provided to draw in air (through operation of a fan described below) to cool a bottom portion of nozzle 108 (FIG. 6) as described below. Fan outlet vents 78 permit ventilation of electronics in tool 50 as is further described below.

Figure 6:
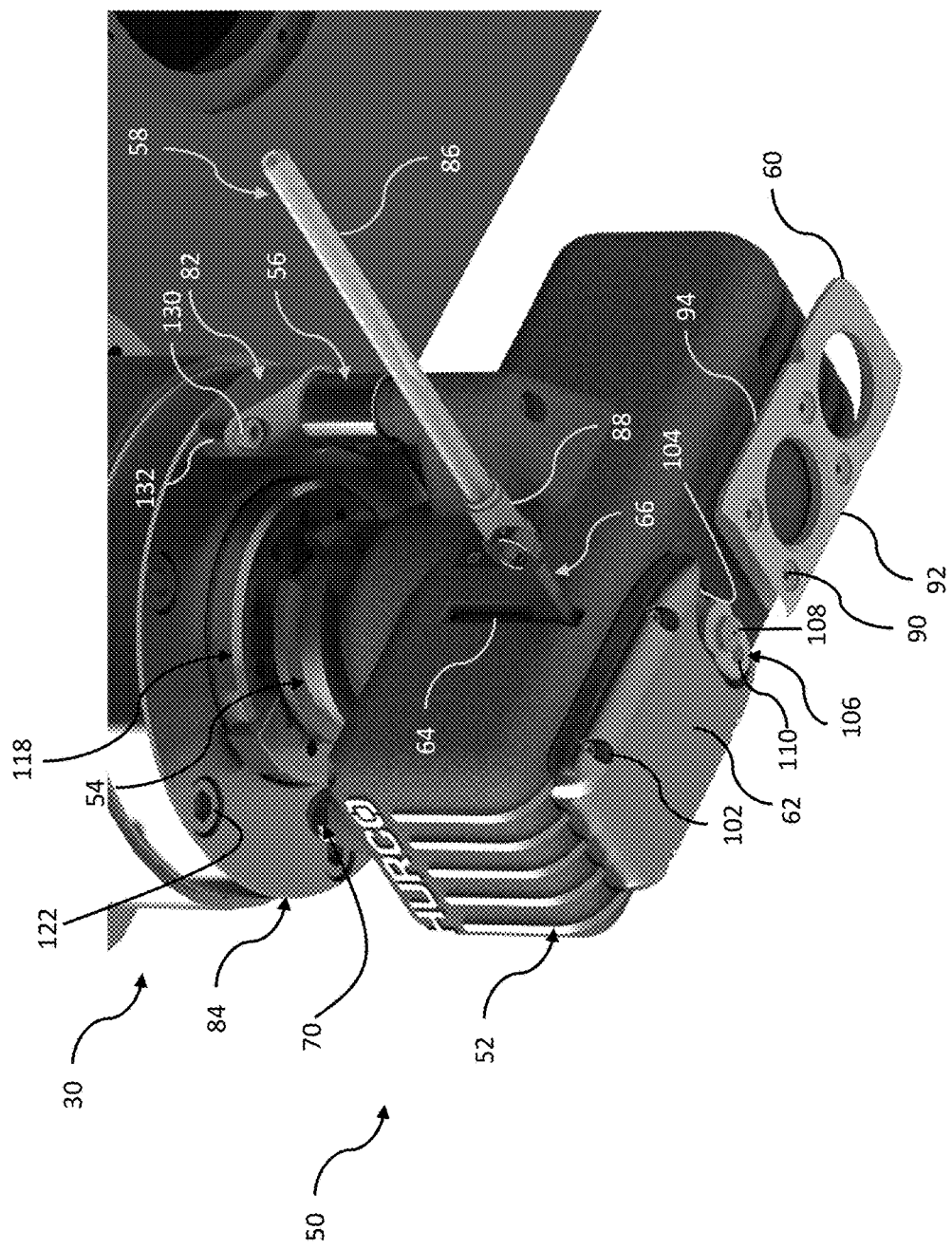

As further described below, tool holder 54 is coupled to spindle 30 and anti-rotate pin 56 is coupled to a stop block 82, which is coupled to a lower plate 84 of spindle 30. In this embodiment, material inlet assembly 58 generally includes a flexible filament tube 86 coupled on one end to a filament source (not shown) and on the other end to a connector 88 to provide filament to tool 50 as described below. As best shown in FIG. 6 (and later described with reference to FIGS. 34 and 35), mount 60 is attached to housing 52 using fasteners 90 and includes a pair of side edges 92, 94 that are spaced apart to correspond to channels 96, 98 formed in a tool picker base 100. In this manner, tool 50 may be mounted to base 100 and automatically coupled to spindle 30 in a conventional. Still referring to FIG. 6, fan shroud 62 is also attached to housing 52 using fasteners 102 and includes a cut-out 104 to accommodate a delivery assembly 106 including a nozzle 108 and heating element 110 as will be further described below.

Figure 4:
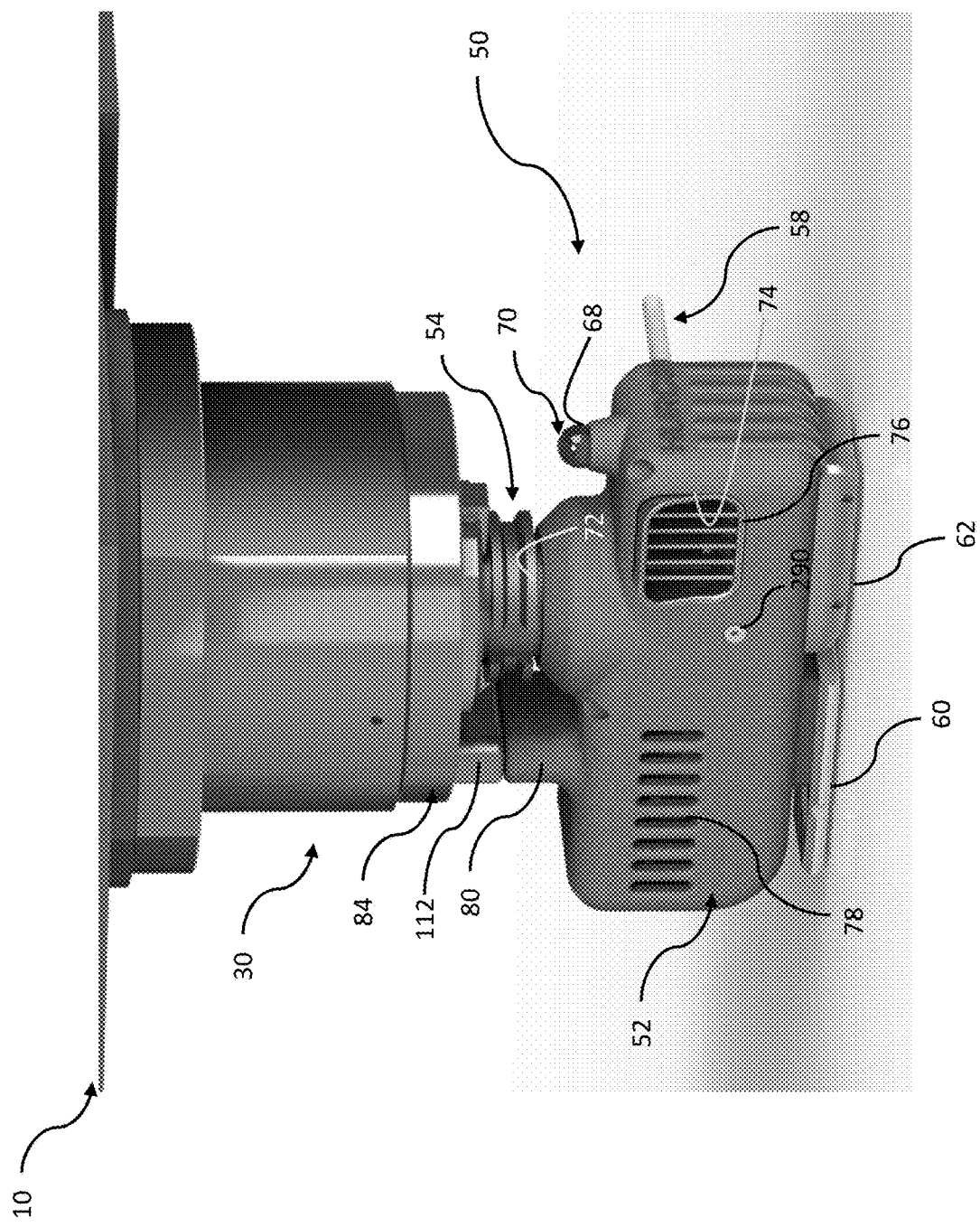
Figure 5:
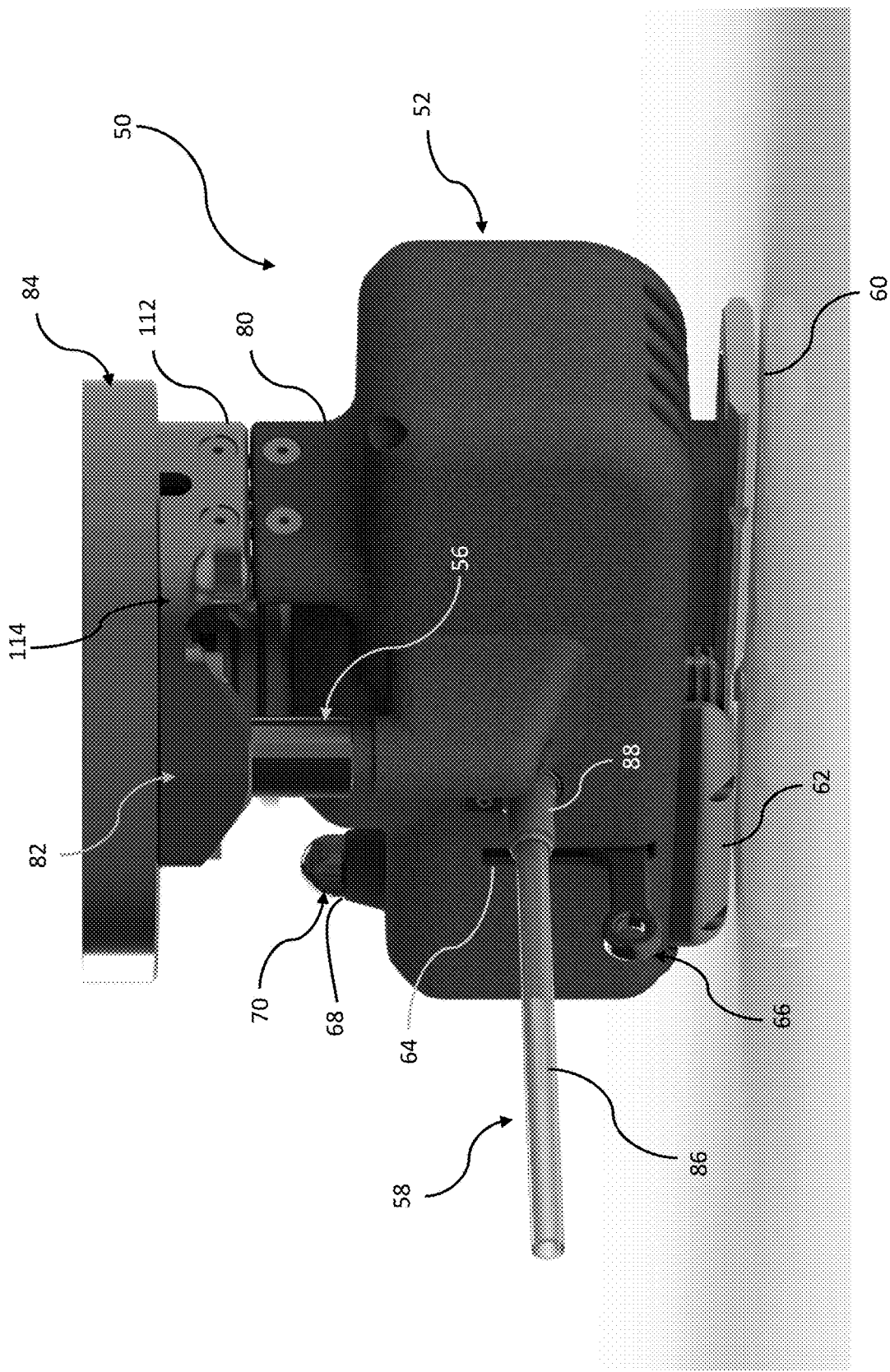

As best shown in FIGS. 4 and 5, dock connector 80 of housing 52 is positioned to align with connector 112, which along with stop block 82 is part of a bracket 114 coupled to lower plate 84 of spindle 30. As is further described below, various electrical signals and power connections are routed through conductors disposed within dock connector 80 and connector 112 to facilitate operation of tool 50 under the control of controller 12 (FIG. 1).

Figure 7:
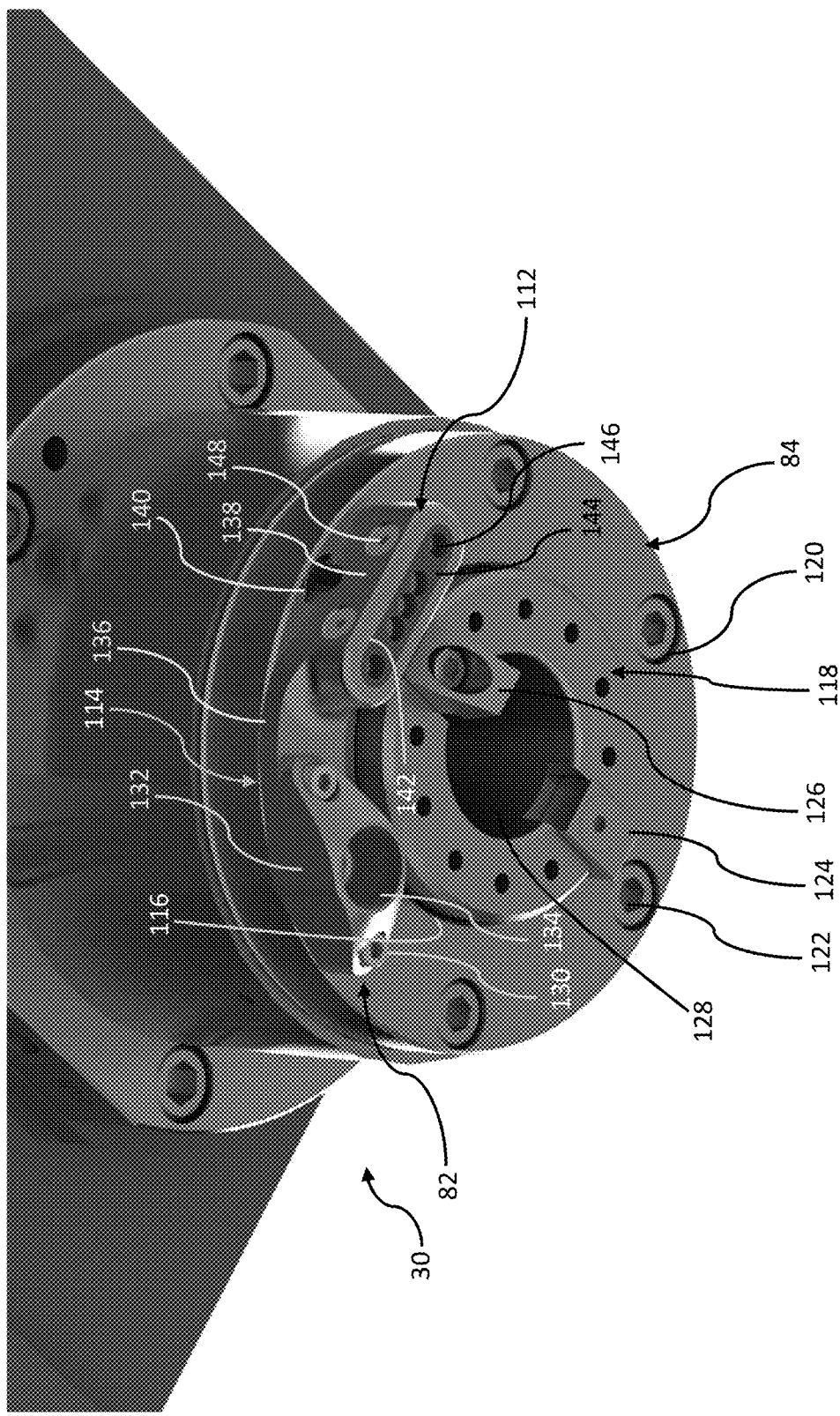
FIG. 7 is a perspective view of a bracket connected to a spindle head for coupling to the tool of FIG. 3.

Referring now to FIGS. 6 and 7, bracket 114 is shown coupled to lower plate 84 of spindle 30. Lower plate 84 is generally ring-shaped and includes a central opening 116 through which extends a tool coupler 118. Lower plate 84 further includes a plurality of openings 120 for receiving a plurality of fasteners 122 used to attach lower plate 84 to spindle 30. In one embodiment, tool coupler 118 includes a pair of standard tool engagement keys 124, 126 which are configured to engage tool holder 54 of tool 50 as tool holder 54 is received within tapered socket 128 of tool coupler 118 in a manner known to those skilled in the art.

Bracket 114 is attached to lower plate 84 using fasteners 130 which pass through openings (not shown) in a body 132 of stop block 82 and thread into openings (not shown) formed in lower plate 84. Body 132 of stop block 82 further includes a central opening 134 for receiving anti-rotate pin 56 as described below. Bracket 114 further includes a bridge 136 connecting body 132 of stop block 82 to a body 138 of connector 112. Connector 112 further includes an opening 140 for routing a cable (not shown) to controller 12 for controlling the operation of tool 50, and an elongated opening 142 for receiving an insert 144 carrying a plurality of conductors 146. Conductors 146 carry power, ground and control signals from CNC machine 10, specifically controller 12, as well as feedback signals from tool 50 to controller 12 as is further described below. While five conductors 146 are shown, it should be understood that in other embodiments more or fewer conductors may be used. Conductors 146 mate with corresponding conductors of dock connector 80 as is further described below. Connecter 112 further includes a pair of set screws 148 that thread through openings formed in body 138 to engage and retain insert 144 within elongated opening 142.

Figure 8:
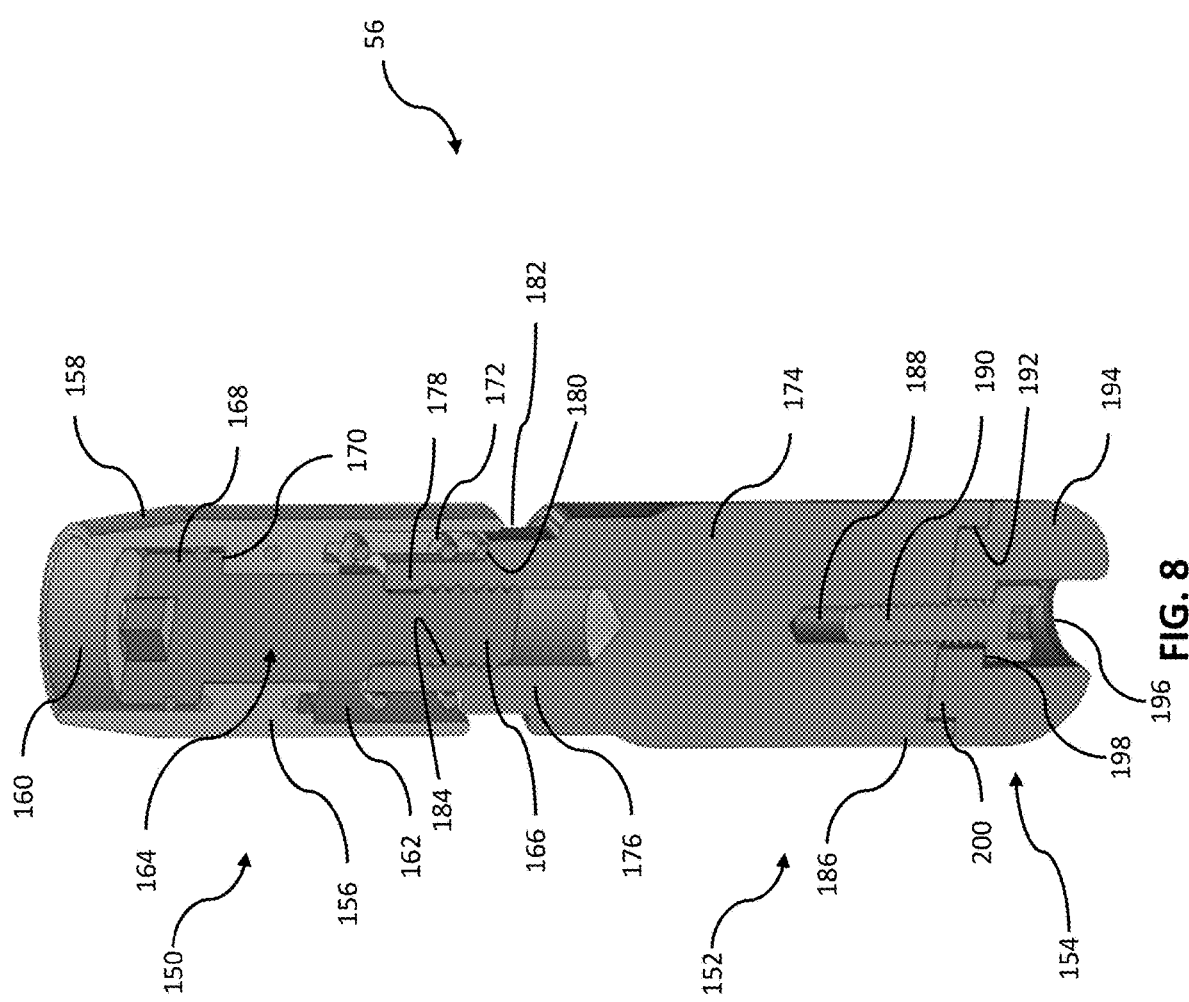
FIG. 8 is a cross-sectional view of an anti-rotate pin.

Referring now to FIG. 8, anti-rotate pin 56 is shown in cross-section. An exploded view including the components of anti-rotate pin 56 is provided in FIG. 18. Pin 56 generally includes an upper section 150, a middle section 152 and a lower section 154. Upper section 150 includes a movable engagement body 156 having a tapered upper end 158, a central opening 160 and a spring recess 162. Upper section 150 further includes a retention bolt 164 having a threaded end 166 and a head 168. Retention bolt 164 extends through central opening 160 of engagement body 156 and head 168 engages an annular shoulder 170 formed in central opening 160. Finally, upper section 150 further includes a spring 172 that is disposed within spring recess 162.

Middle section 152 of pin 56 includes a substantially cylindrical body 174 having an upper end 176 with a tip 178, a shoulder 180 against which spring 172 engages, and a guide surface 182 on which body 156 slides during operation. A threaded opening 184 extends into upper end 176 to receive retention bolt 164 in the manner described below. Body 174 also includes a lower end 186 with another threaded opening 188 configured to receive a fastener 190 of lower section 154. Lower end 186 further includes a recess 192.

Lower section 154 includes a body 194 with a central opening 196 forming a shoulder 198. Body 194 further includes a projection 200 configured to be received within recess 192 of lower end 186 of body 174 and to engage recess 192.

Figure 18:
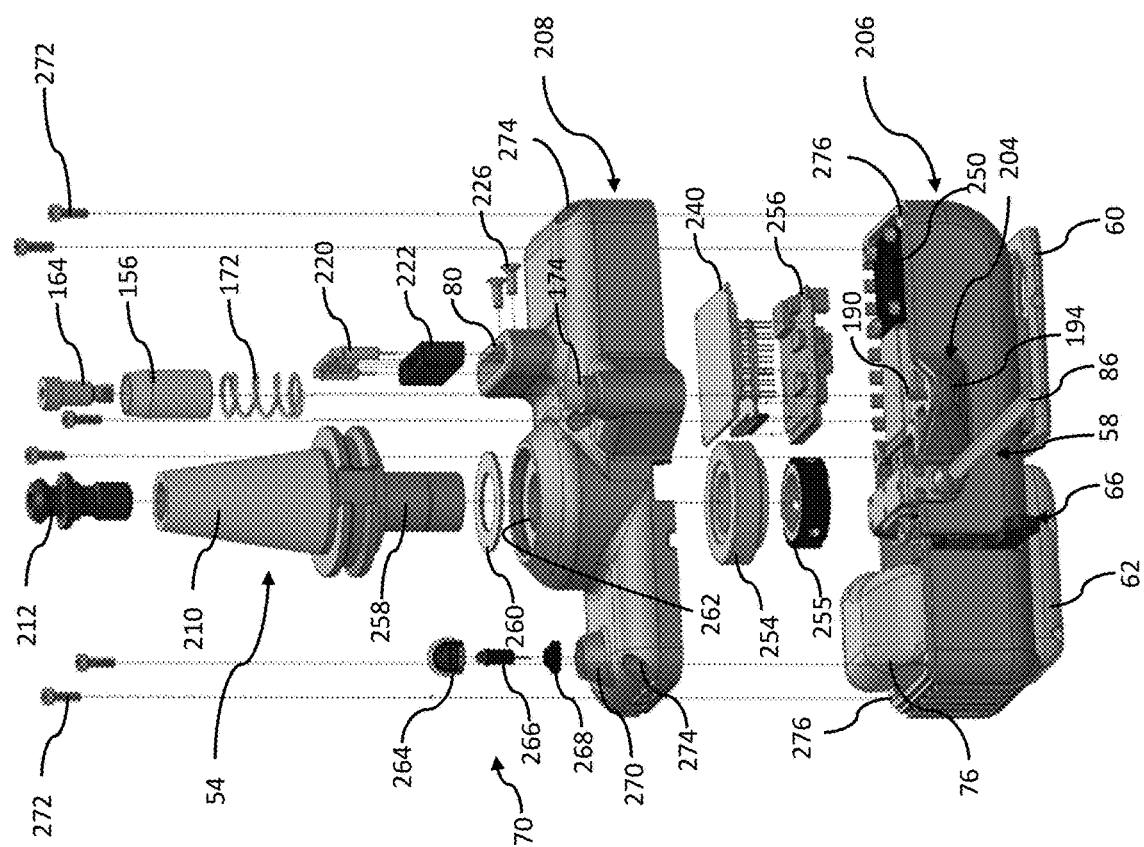
FIG. 18 is an exploded perspective view of the upper components of the tool of FIG. 3.

Referring now to FIGS. 8 and 18, anti-rotate pin 56 is assembled and coupled to housing 52 of tool 50 in the following manner. Anti-rotate pin 56 is provided to establish alignment in spindle 30 and to prevent tool 50 from spinning when spindle 30 is in operation. Body 194 of lower section 154 is placed adjacent a flange 204 of a lower portion 206 of housing 52 and fastener 190 is passed through central opening 196 of body 194 and through an opening formed in flange 204. Body 174 of middle section 152 is placed into an opening in an upper portion 208 of housing 52 such that upper end 176 of body 174 extends upwardly from upper portion 208 as shown in FIG. 18. When upper portion 208 of housing 52 is attached to lower portion 206, fastener 190 is screwed into threaded opening 188 such that projection 200 enters recess 192, thereby connecting lower section 154 of pin 56 to middle section 152 of pin 56. Next, spring 172 is placed over tip 178 and onto shoulder 180 of middle section 152. Engagement body 156 is then placed onto tip 178, whereupon spring 172 enters spring recess 162. Finally, retention bolt 164 is placed through central opening 160 and threaded into threaded opening 184 of middle section 152. In this manner, spring 172 is compressed within spring recess 162 such that spring 172 biases engagement body 156 away from middle section 152. Engagement body 156 is thereby movable along its longitudinal axis with and against the biasing force of spring 172 and is guided by guide surface 182. This movement provides tolerance as anti-rotate pin 56 is inserted into central opening 134 of stop block 82.

Figure 9:
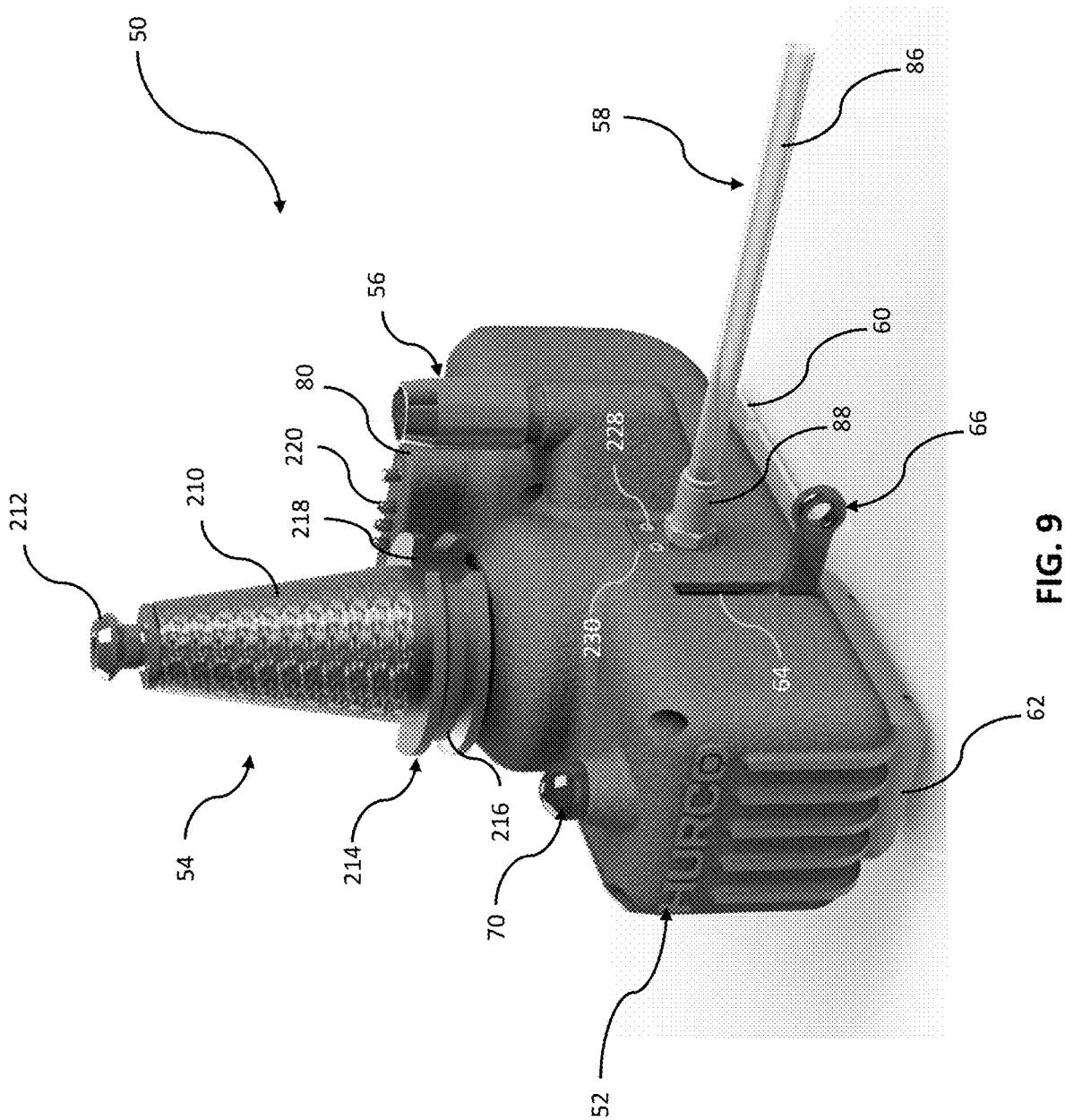
FIGS. 9-11 are perspective views of the tool of FIG. 3 detached from the spindle head.
Figure 10:
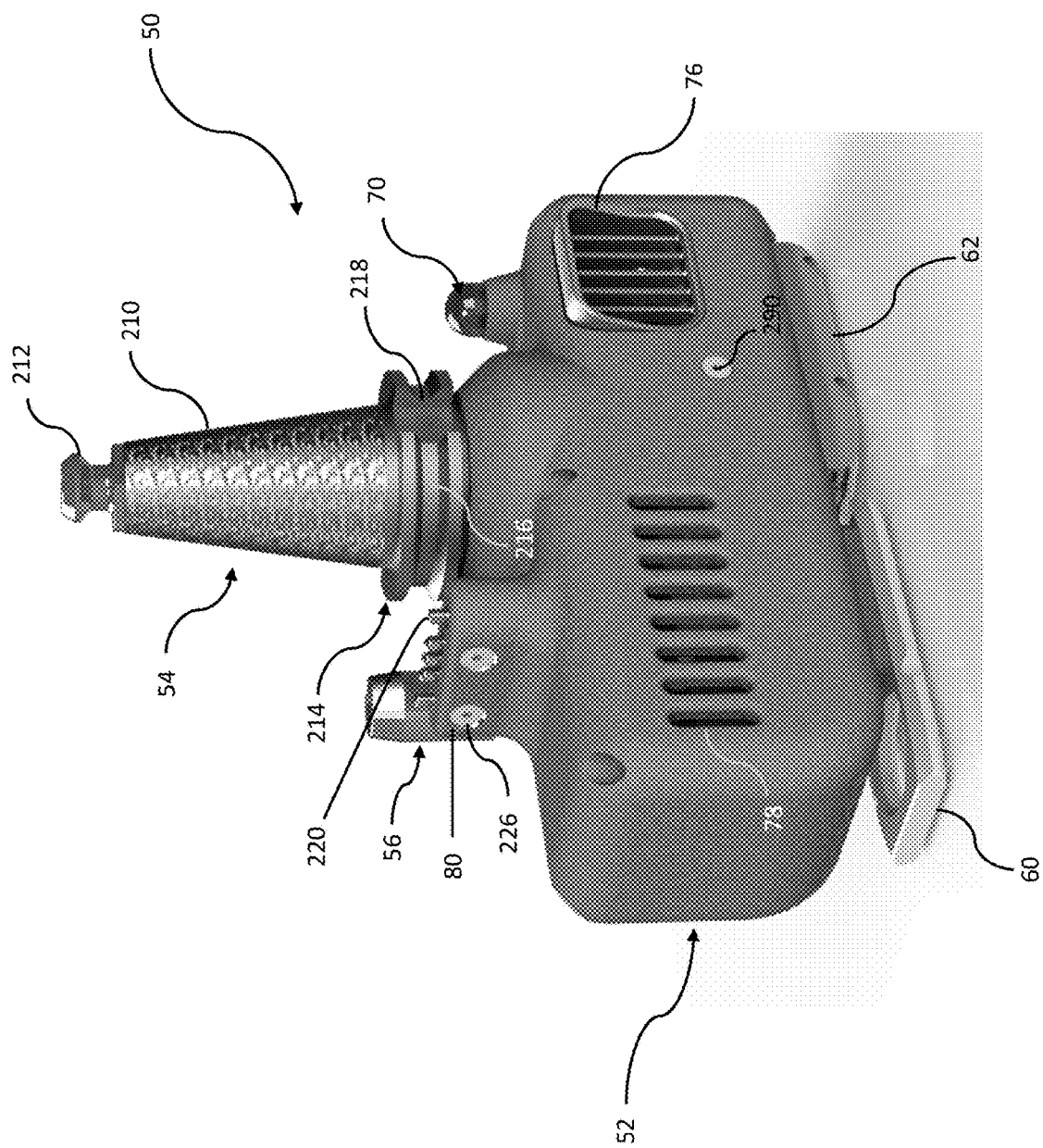
Figure 11:
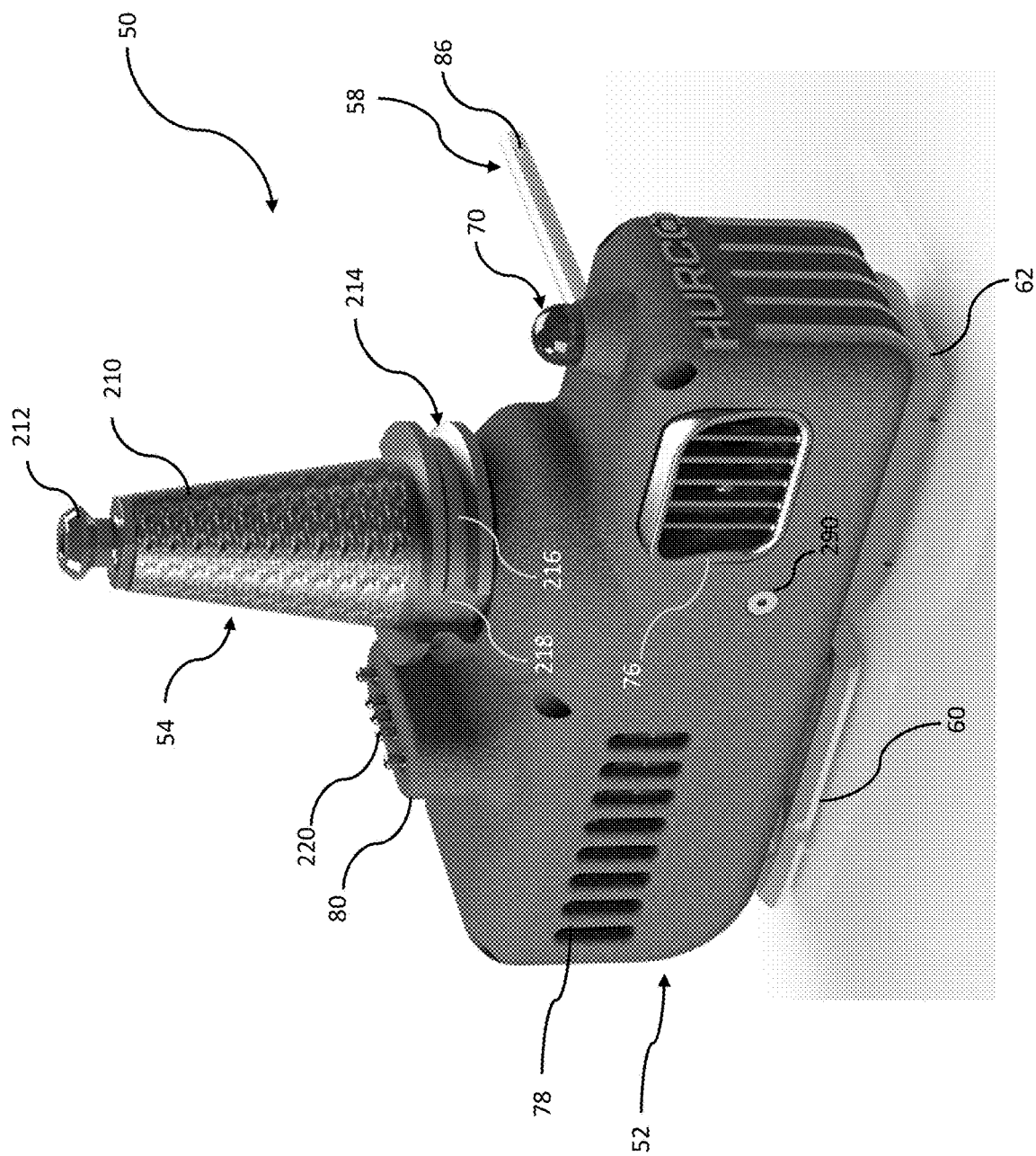
Figure 12:
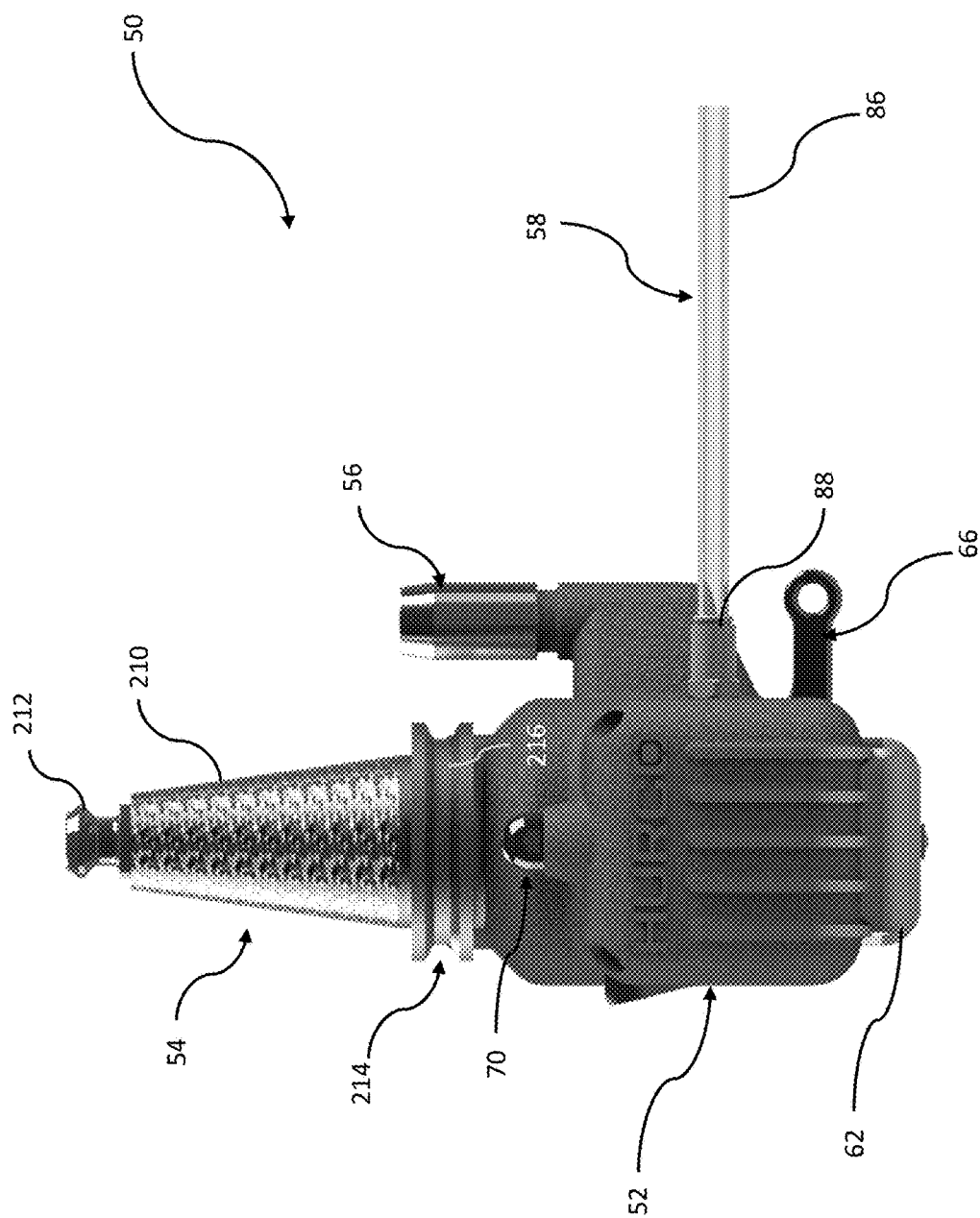
FIG. 12 is a front end view of the tool of FIG. 3 detached from the spindle head.
Figure 13:
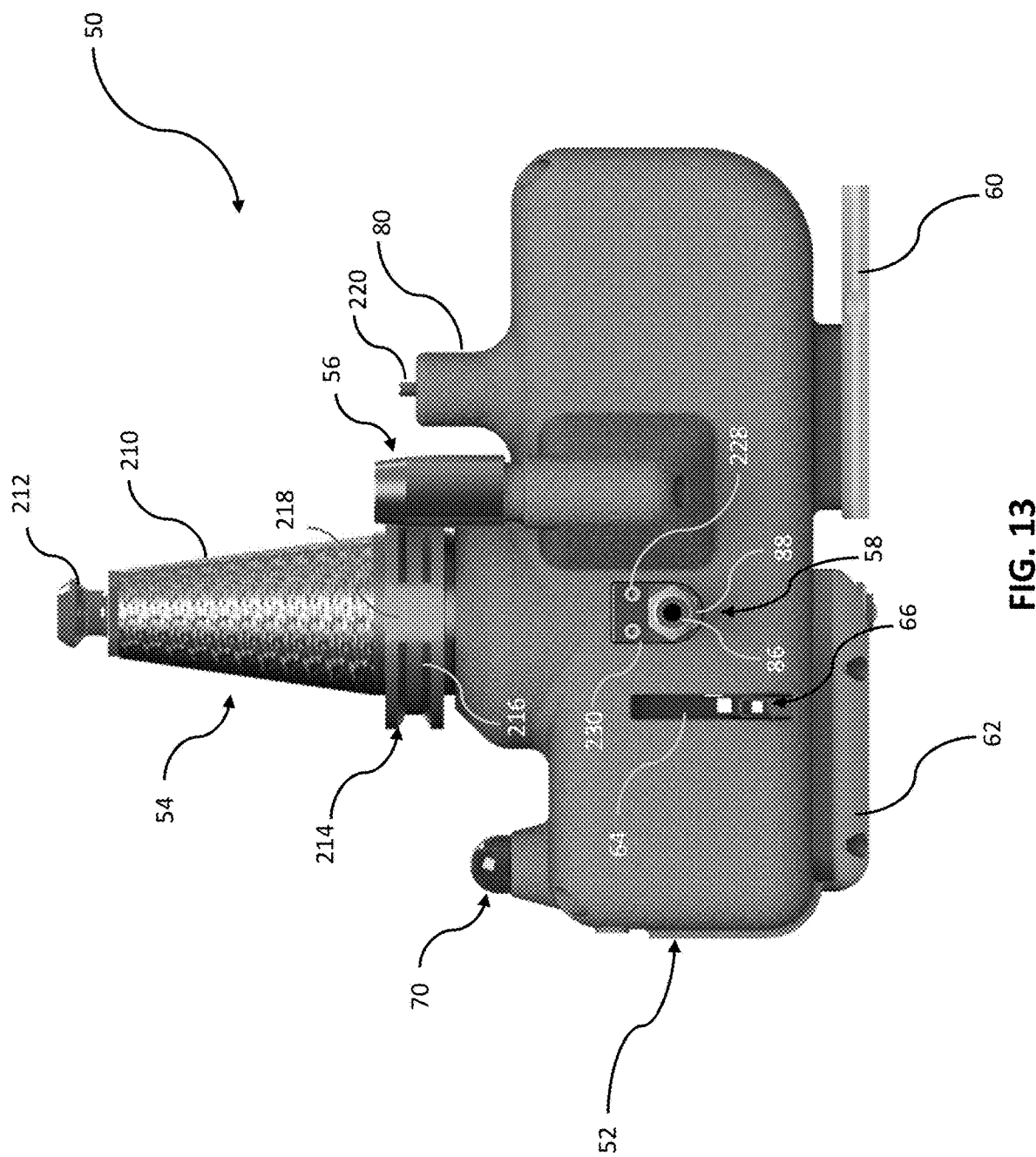
FIGS. 13 and 14 are side views of the tool of FIG. 3 detached from the spindle head.
Figure 14:
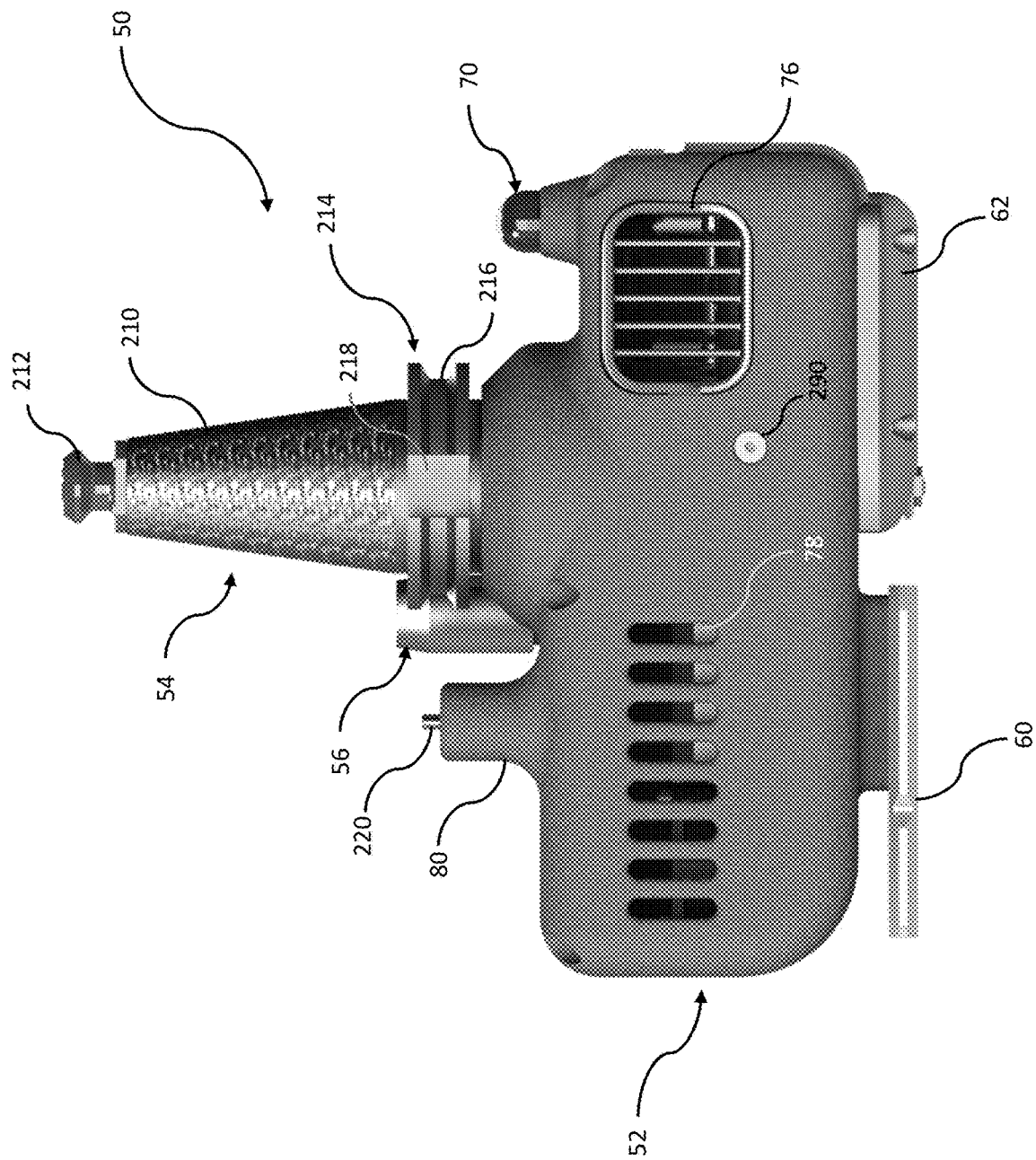
Figure 15:
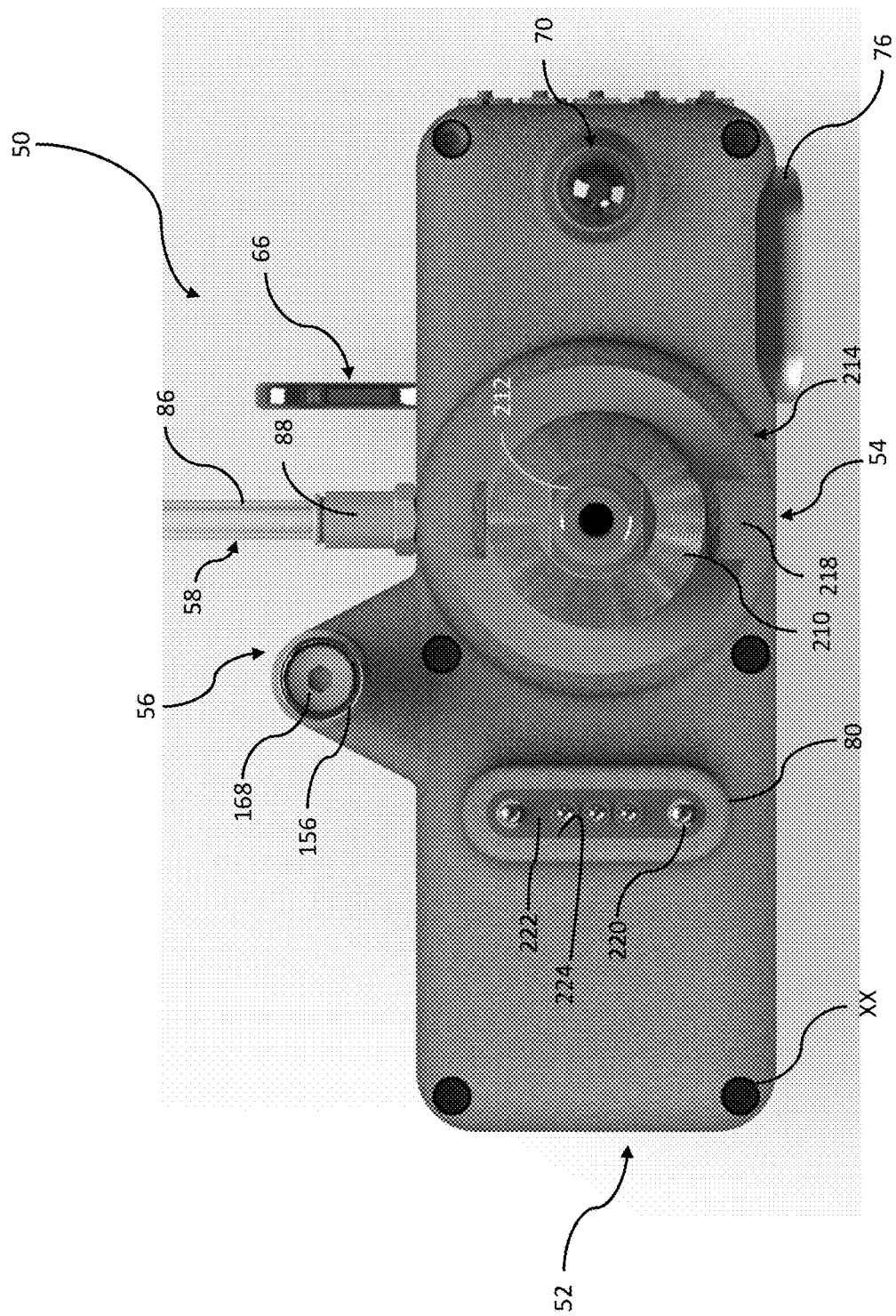
FIG. 15 is a top view of the tool of FIG. 3 detached from the spindle head.
Figure 21:
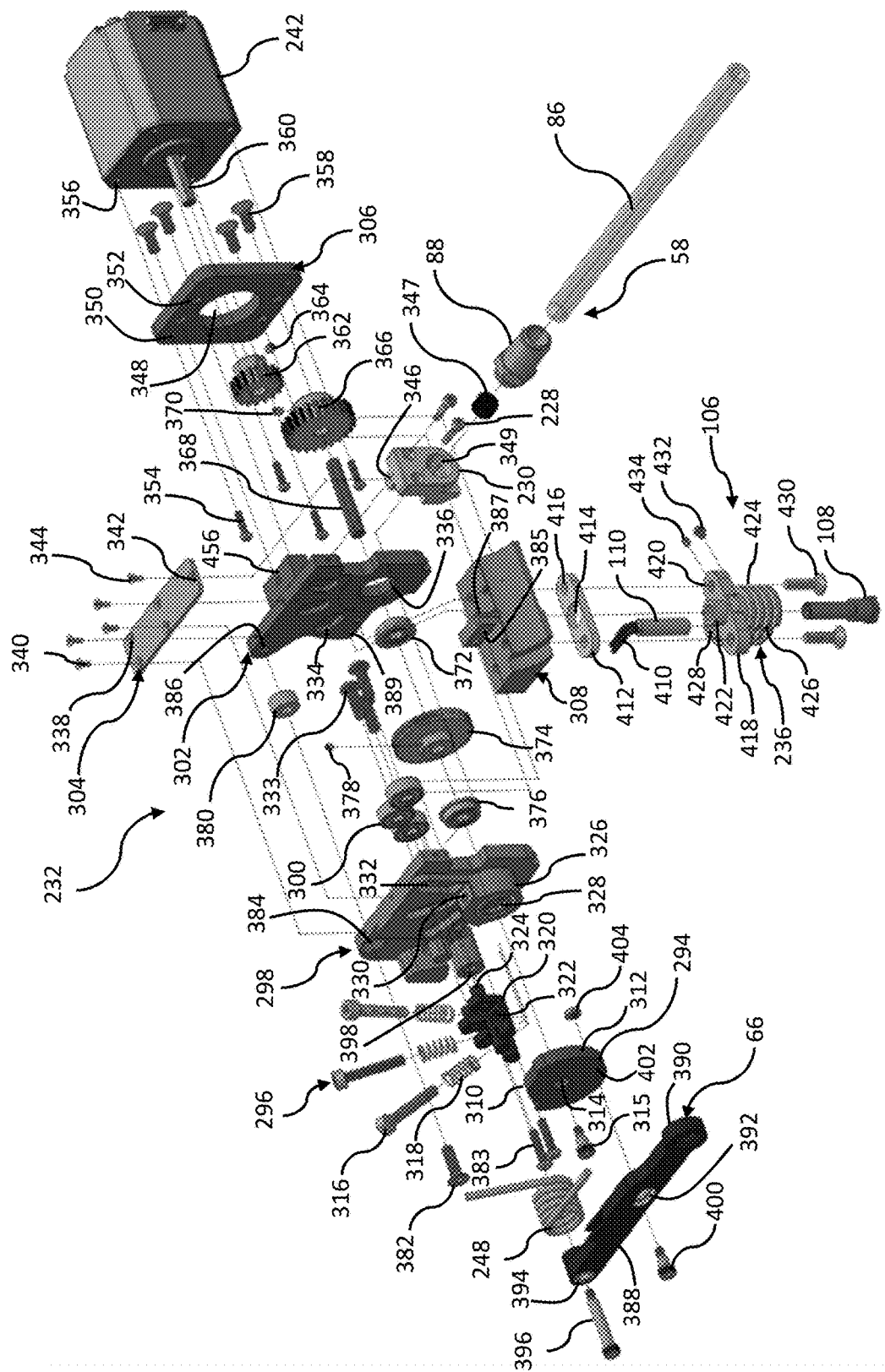
FIG. 21 is an exploded perspective view of the drive assembly of FIG. 20.

Referring now to FIGS. 9-16, additive manufacturing tool 50 is depicted in several views detached from CNC machine 10. As best shown in FIG. 9, tool holder 54 includes a tapered body 210 which is received in tapered socket 128 (FIG. 7) of spindle 30, a retention knob 212 at an upper end of tapered body 210 which is gripped by a clamping mechanism (not shown) in spindle 30, and a flange 214 at a lower end of tapered body 210. Flange 214 includes a V-groove 216 configured to be engaged by a gripping mechanism of an automatic tool changer (not shown) which is commonly used in the art. Flange 214 further includes at least one flat 218, which ensures that tool 50 is in the same angular position in spindle 30 each time the tool is installed. Moreover, flat 218 ensures that tool 50 does not spin. The figures also depict a plurality of conductors 220 projecting from dock connector 80. In one embodiment, conductors 220 are formed from brass although other conductive materials such as copper, gold, etc. may be used. As best shown in FIG. 15, conductors 220 are disposed within an insert 222 that is received within an opening 224 of dock connector 80. In one embodiment of the present disclosure, insert 222 is configured as an 8-pin Ethernet connector, although other connector configurations are envisioned. As shown in FIG. 10, a pair of set screws 226 are threaded into openings formed in dock connector 80 to secure insert 222 (and therefore conductors 220) in place. In one embodiment, tool 50 is approximately 4 inches wide (including anti-rotate pin 56), 8 inches long and 9 inches tall (from retention knob 212 to nozzle 108). In one embodiment, tool 50 weighs approximately 6 to 8 pounds. As best shown in FIGS. 13 and 21, screws 228 are used to attach an inlet bracket 230 to a drive assembly 232 that is described in detail below.

Figure 16:
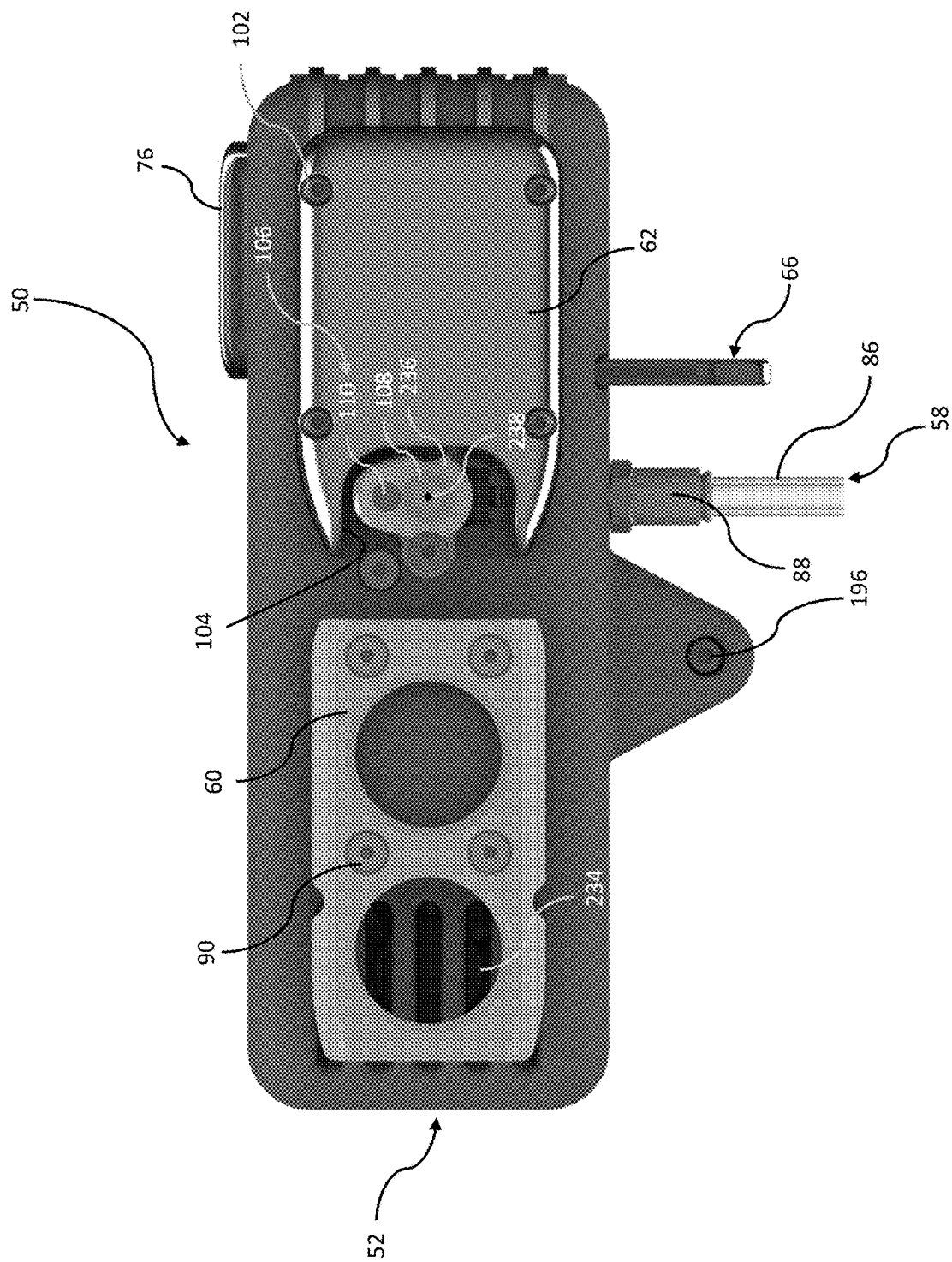
FIG. 16 is a bottom view of the tool of FIG. 3 detached from the spindle head.

Referring now to FIG. 16, a plurality of fan inlet vents 234 are show for providing air to a first fan 250 (FIG. 17) that cools a stepper motor and other electronics in tool 50 as described below. Also, a bottom view of delivery assembly 106 is provided showing nozzle 108 and heating element 110 extending through a nozzle mount 236. As is further described below, nozzle 108 is removable from nozzle mount 236 and may be replaced with other, similar nozzles having different sized outlet openings 238 to deposit melted filament of different diameters.

Figure 17:
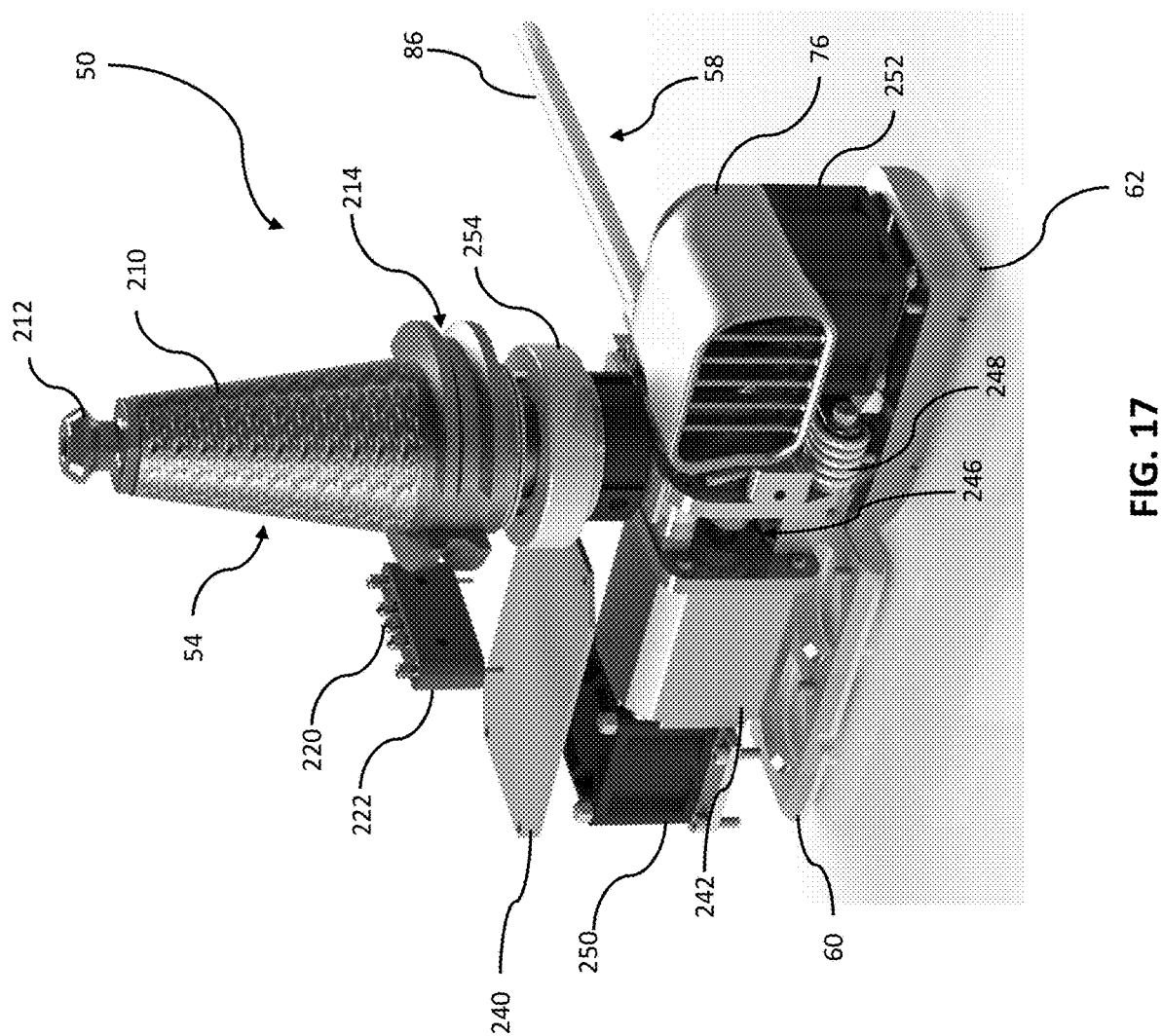
FIG. 17 is a perspective view of the tool as depicted in FIG. 11 with the housing removed.

FIG. 17 depicts tool 50 with housing 52 removed. As shown, tool 50 further generally includes a control board mount 240, a stepper motor 242 that powers a drive gear 362, a spring 248 that biases lever 66 in a downward inactive position (lever 66, which functions as a clutch, must be raised to an active position to remove filament as is further described below), a first fan 250 for electronics on cooling control board mount 240, and a second fan 252 for cooling delivery assembly 106. Also shown is a bearing 254 that permits tool holder 54 to rotate if spindle 30 is activated accidentally. Retention knob 212, tapered body 210, needle roller thrust bearing 260, bearing 254 and a lock nut 255 turn with spindle 30 when engaged.

Referring now to FIG. 18, which is an exploded view of components disposed in upper portion 208 of housing 52, a control board 256 is shown for mounting below control board mount 240. Control board 256 includes a plurality of electronic components for enabling tool 50 to perform the various functions described herein such as maintaining a desired temperature of heating element 110, activating and deactivating tool 50, controlling the stepper motor described herein to cause it to stop, go, retract and provide speed control. Tool holder 54 is shown as further including a shaft 258 that extends through a needle roller thrust bearing 260 and an opening 262 in upper portion 208 of housing 52 and into bearing 254 and lock nut 255. Indicator 70 is shown as including a lens 264 that covers a lamp 266 which extends through a bushing 268 that sits within projection 270 of upper portion 208. A plurality of bolts 272 extend through openings 274 formed in upper portion 208 and into threaded openings 276 formed in lower portion 206 to secure upper portion 208 of housing 52 to lower portion 206.

Figure 19:
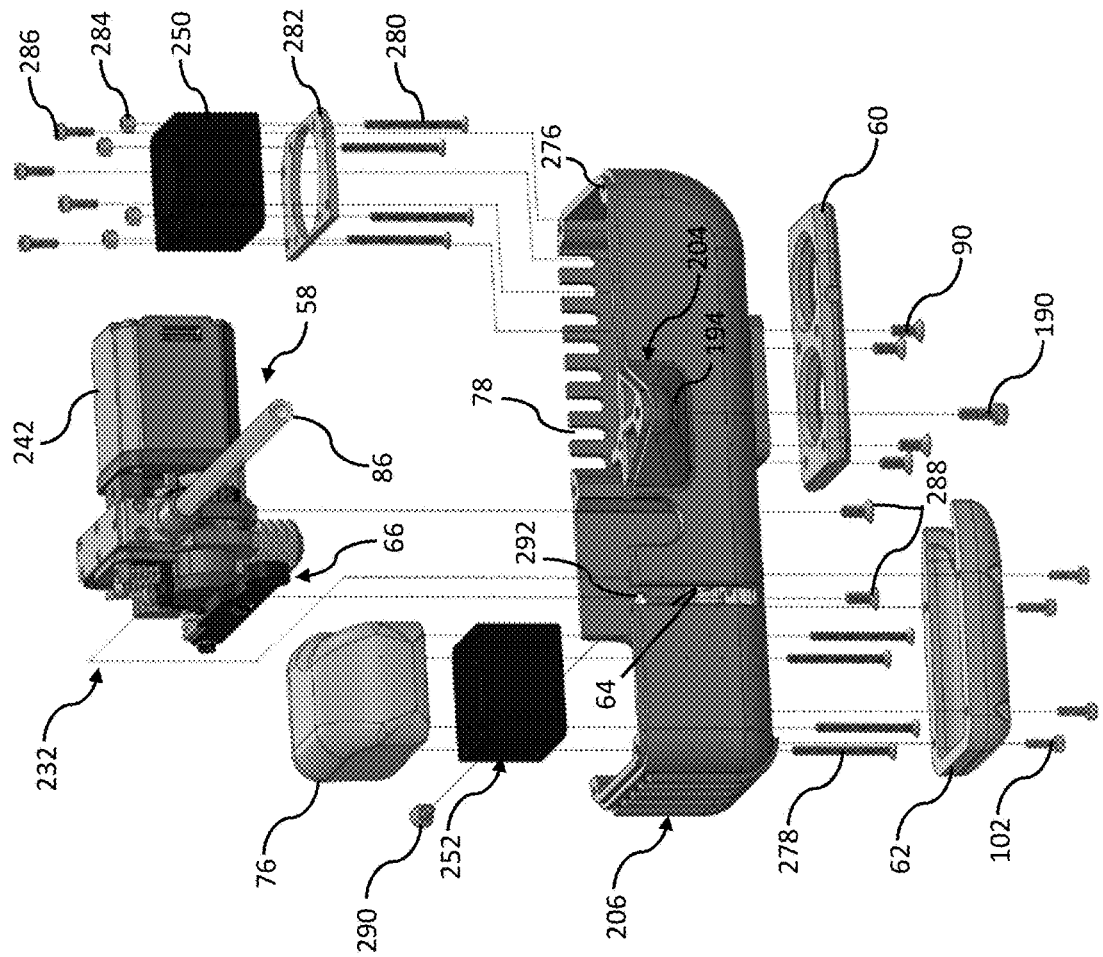
FIG. 19 is an exploded perspective view of the lower components of the tool of FIG. 3.

Referring now to FIG. 19, which is an exploded view of components disposed in lower portion 206 of housing 52, additional mounting hardware is shown. Specifically, elongated bolts 278 extend through lower openings (not shown) in lower portion 206, through bores (not shown) formed through second fan 252 and into threaded openings (not shown) in a lower surface of air inlet 76 to secure second fan 252 and air inlet 76 to lower portion 206 of housing 52.

Additionally, a plurality of elongated bolts 280 extend through openings in a mounting bracket 282 and bores through first fan 250 to mate with nuts 284 to secure bracket 282 to first fan 250. Another plurality of bolts 286 extend through additional openings in bracket 282 and into threaded openings (not shown) in lower portion 206 to secure bracket 282 and first fan 250 to housing 52. A pair of bolts 288 extend through openings (not shown) in lower portion 206 and into threaded openings (not shown) of drive assembly 232 to attach drive assembly 232 to lower portion 206. Another fastener 290 extends through an opening 292 in the side of lower portion 206 and into a threaded opening (not shown) in drive assembly 232 to further secure drive assembly 232 to lower portion 206.

Figure 20:
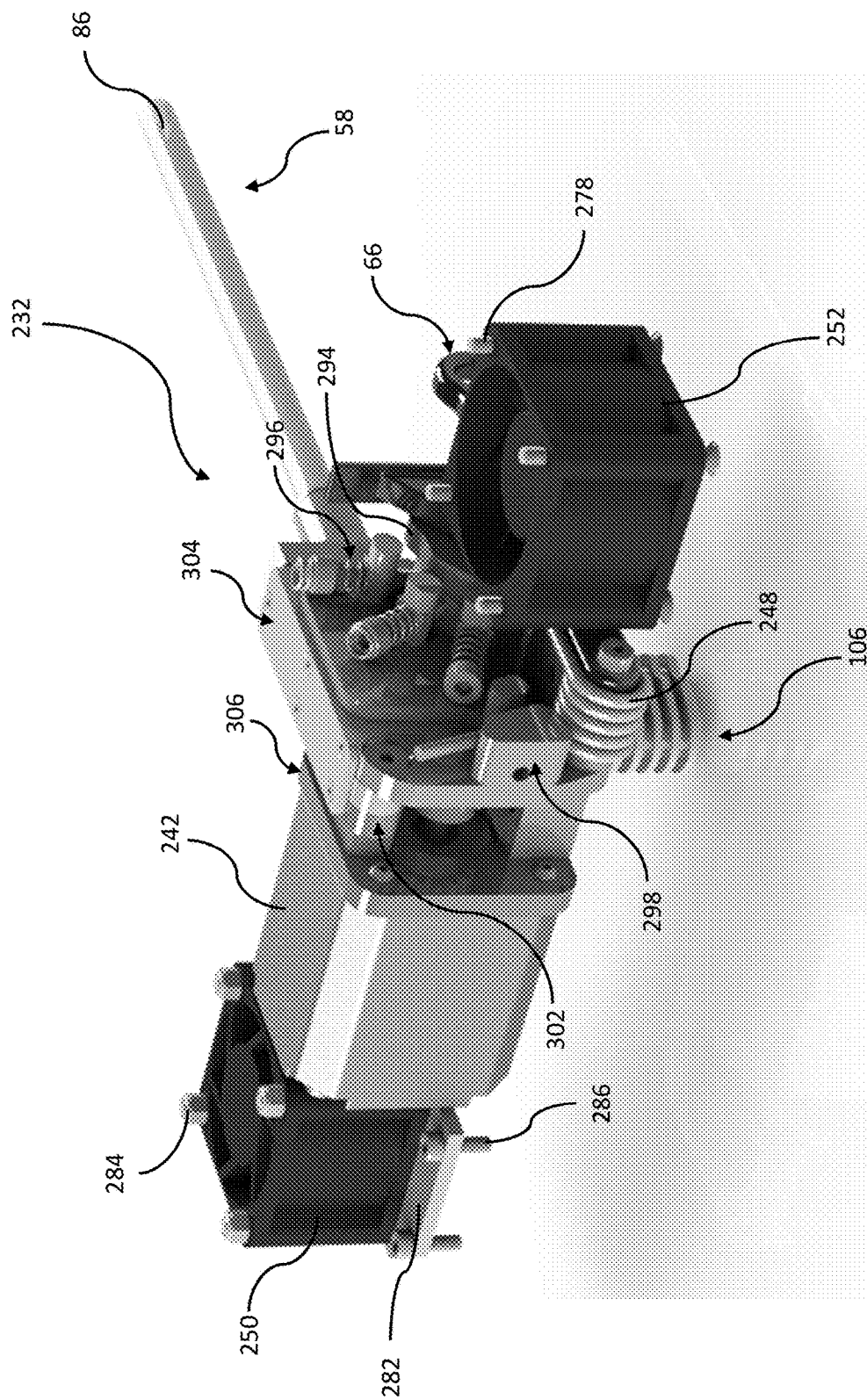
FIG. 20 is a perspective view of a drive assembly of the tool of FIG. 3.

Referring now to FIG. 20, the components housed in lower portion 206 are shown with lower portion 206 removed. More specifically, FIG. 20 shows first fan 250, mounting bracket 282, stepper motor 242, drive assembly 232, material inlet assembly 58, delivery assembly 106 and second fan 252. Further details are depicted in the exploded view of FIG. 21. In particular, drive assembly 232 generally includes a cam 294, three wheel drive assemblies 296, a forward drive plate 298, three drive wheels 300 (FIG. 21), a rearward drive plate 302, a connecting plate 304, a motor mount 306 and a delivery mount 308 (FIG. 21). It should be understood that although three wheel drive assemblies 296 and three drive wheels 300 are described herein, more or fewer assemblies 296 and wheels 300 may be used according to the teachings of the present disclosure depending upon the application. As best shown in FIG. 21, cam 294 includes a recessed surface 310 on its outer edge 312 and a central opening 314. A pivot bolt 315 extends through central opening 314 and is threaded into a central opening 328 of forward drive plate 298 to permit rotational movement of cam 294 as is further described below.

Referring now to FIG. 21, each wheel drive assembly 296 includes a bolt 316, a spring 318, and an axle member 320. As shown, each axle member 320 includes a shoulder opening 322 and an axle 324. Forward drive plate 298 generally includes a cam boss 326 having central opening 328. Cam boss 326 further includes three threaded openings 330 for receiving bolts 316 of wheel drive assemblies 296 to preset the biasing force of springs 318 as is further described below. Forward drive plate 298 also includes three slots 332 for receiving axles 324 of axle members 320 to permit movement of axle members 320 between a lowered position and a raised position as is further described below. Bolts 333 are threaded through drive wheels 300 and slots 332, and threaded into axles 324 to permit rotation of drive wheels 300 on bolts 333. Rearward drive plate 302 includes three elongated recesses 334 for guiding axles 324 of axle members 320 during movement within slots 332. Rearward drive plate 302 further includes a drive opening 336 for facilitating rotational movement of drive disc 374 as is described below.

Connecting plate 304 includes a plurality of openings 338 through which a corresponding plurality of screws 340 are threaded and received by threaded openings in forward drive plate 298 and rearward drive plate 302 to connect the drive plates 298, 302 together. Connecting plate 304 further includes an opening 342 for receiving a screw 344 that is received by a threaded opening 346 in inlet bracket 230. A foam pre-cleaner 347 is received in an opening 349 of inlet bracket 230 and mates with connector 88 of material inlet assembly 58. Pre-cleaner 347 removes debris from incoming filament.

Motor mount 306 includes a central opening 348, a first plurality of bores 350 and a second plurality of bores 352. A first plurality of screws 354 are passed through first plurality of bores 350 and threaded into openings 356 on stepper motor 242 to couple stepper motor 242 to motor mount 306. A second plurality of screws 358 are passed through second plurality of bores 352 and threaded into openings (not shown) on rearward drive plate 302 to couple motor mount 306 and stepper motor 242 to rearward drive plate 302.

As shown, stepper motor 242 includes a drive shaft 360 that extends through central opening 348 of motor mount 306 into drive gear 362. Drive gear 362 is retained on drive shaft 360 by set screw 364. Drive gear 362 meshes with a follower gear 366, causing follower gear 366 to rotate, which results in rotation of a shaft 368 on which follower gear 366 is retained by a set screw 370. Shaft 368 extends through a bearing 372 that fits within drive opening 336 of rearward drive plate 302. Shaft 368 further extends through drive disc 374 and into a second bearing 376 that fits within central opening 328 of cam boss 326. Drive disc 374 is attached to shaft 368 by set screw 378 such that drive disc 374 rotates with shaft 368 while being supported by bearings 372, 376.

Still referring to FIG. 21, drive assembly 232 further includes a spacer 380 that separates forward drive plate 298 from rearward drive plate 302. A screw 382 extends through an opening 384 in forward drive plate 298, through spacer 380 and into a threaded opening 386 in rearward drive plate 302. Also, a pair of screws 383 extend through openings (not shown) of forward drive plate 298, through openings 385 of spacer block 387 of delivery mount 308, and thread into threaded openings 389 of rearward drive plate 302.

Lever 66 includes a body 388 having a handle end 390, a slot 392 and a pivot opening 394. A pivot pin 396 extends through pivot opening 394, through spring 248 and into a threaded opening 398 to secure lever 66 to forward drive plate 298 such that lever 66 pivots about pivot pin 396. A guide pin 400 extends though slot 392 and an opening 402 in cam 294. The threaded end of guide pin 400 receives a nut 404 which couples guide pin 400 to cam 294. When guide pin 400 is so secured, it is movable within slot 298 to permit guided movement of cam 294 by lever 66 in the manner described below.

Figure 31:
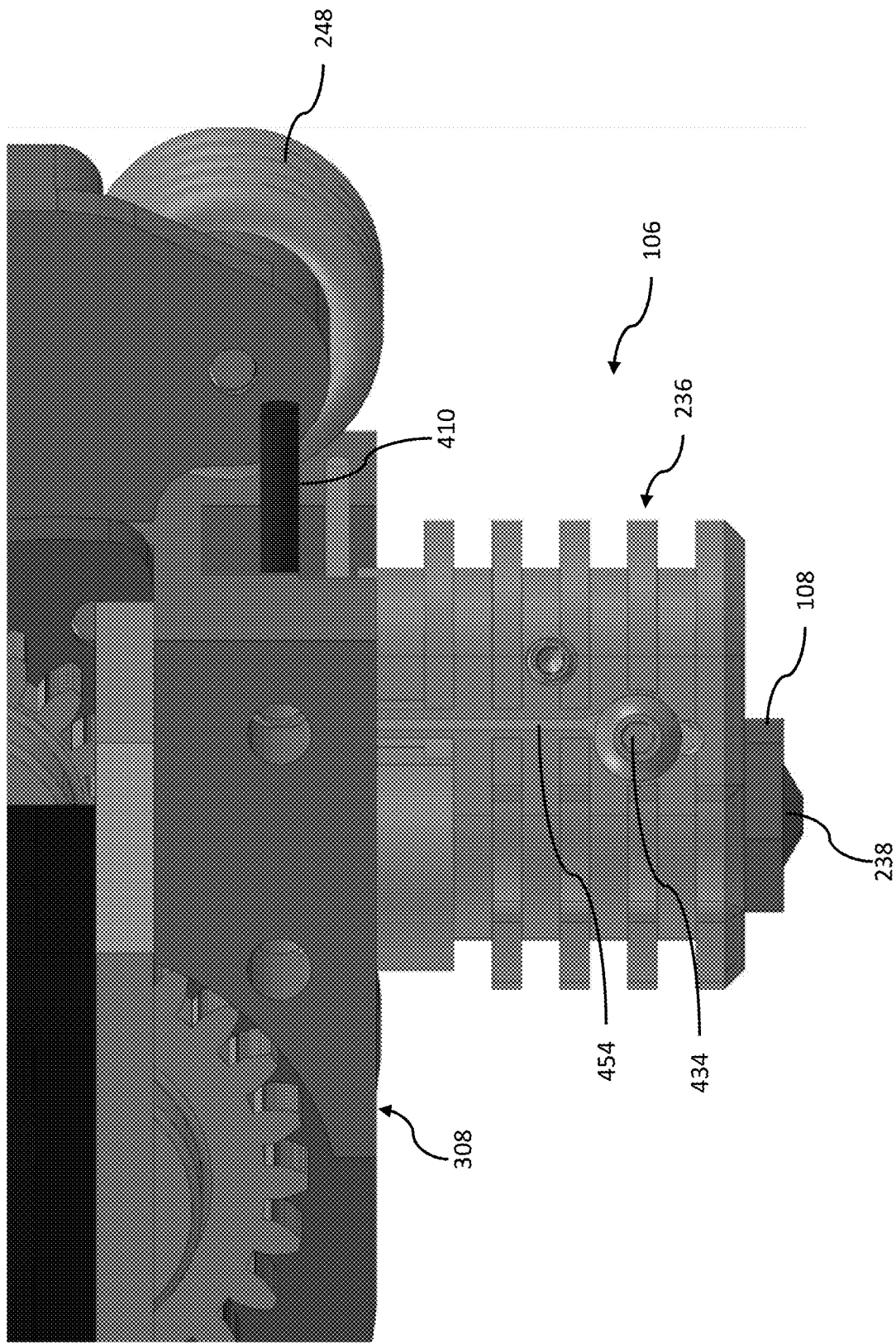
FIG. 31 is side view of the delivery assembly of FIG. 30.

Still referring to FIG. 21, components of delivery assembly 106 are shown. Delivery assembly 106 generally includes heating element 110 having conductors 410 extending therefrom, a delivery bracket 412, nozzle mount 236, and nozzle 108. Delivery bracket 412 includes a delivery opening 414 and a pair of mounting holes 416. Nozzle mount 236 includes a mounting flange 418 having mounting holes 420 and a delivery tube 422, and a delivery body 424 having cooling fins 426 and a heating element opening 428. When assembled, heating element 110 is situated within heating element opening 428 and nozzle 108 is threaded into a nozzle opening 427 (FIGS. 26 and 27) at the bottom of nozzle mount 236 such that the other end of nozzle 108 extends into delivery tube 422. Delivery tube 422 is passed through delivery opening 414 of delivery bracket 412. Finally, screws 430 of delivery assembly 106 are passed through mounting holes 420 of mounting flange 418 and mounting holes 416 of delivery bracket 412, and threaded into openings (not shown) of delivery mount 308. Set screw 432 is threaded 454 into nozzle mount 236 to retain a thermistor positioned in nozzle mount 236 as shown in FIG. 31. Heating element 110 is held in place in delivery body 424 by a set screw 434.

Figure 22:
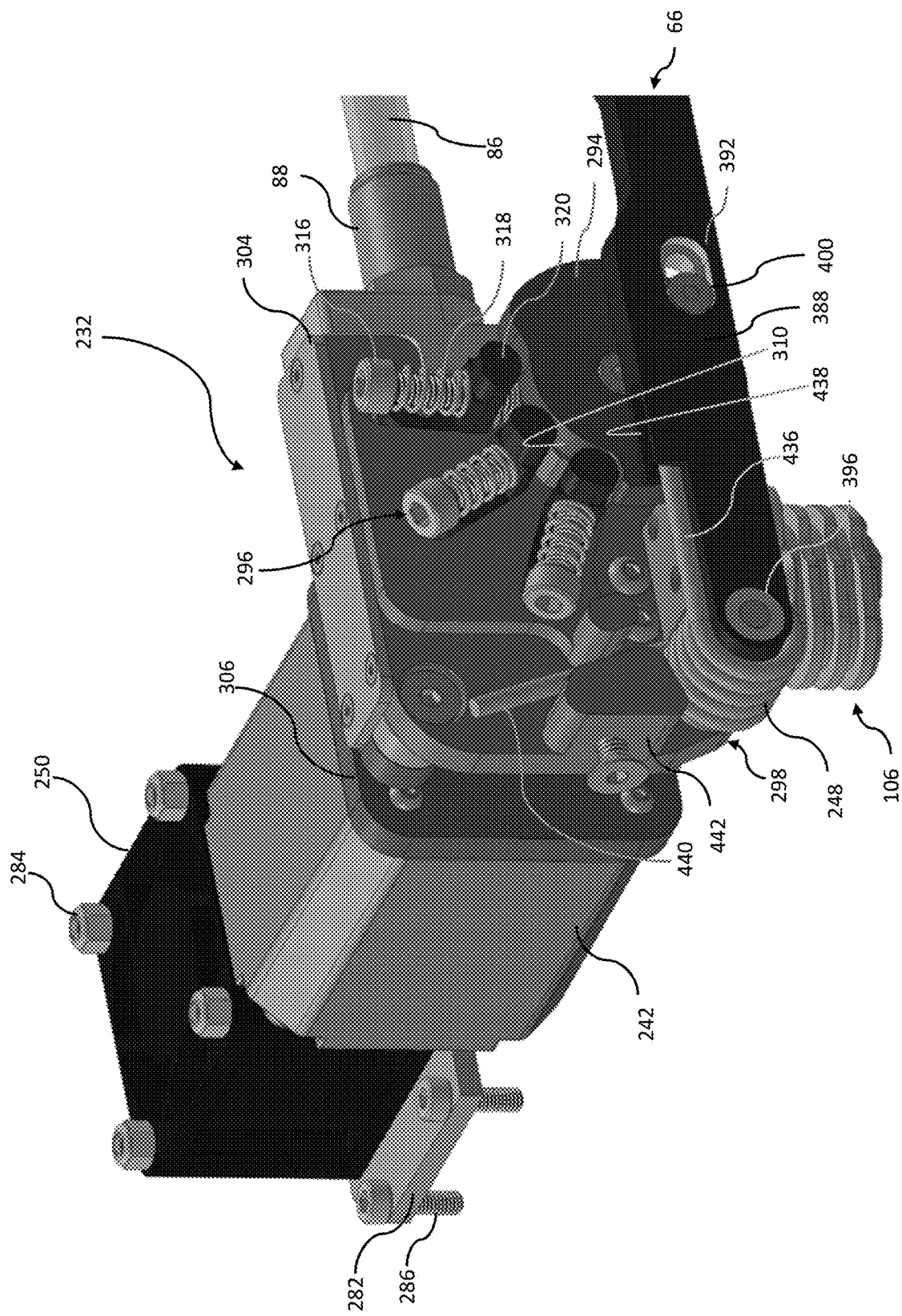
FIG. 22 is a perspective view of the drive assembly of FIG. 20 shown in an engaged position.

Referring now to FIGS. 22-25, the manner in which lever 66 is used to rotate cam 294 to move drive assembly 232 between an engaged position and a disengaged position is described. In FIG. 22, drive assembly 232 is in an engaged position. When in the engaged position, axle members 320 of each wheel drive assembly 296 are biased downwardly by springs 318 to the lowered position, and engage recessed surface 310 of cam 294. Consequently, drive wheels 300 (see FIG. 21) on the other side of forward drive plate 298, which move with axle members 320, are in their lowermost engaged position such that drive wheels 300 urge filament (not shown) supplied by filament tube 86 against drive disc 374 as is further described below. Thus, when drive disc 374 rotates with shaft 368 and follower gear 366, filament is moved through drive assembly 232 around drive disc 374 and into delivery assembly 106 as is further described below.

Figure 23:
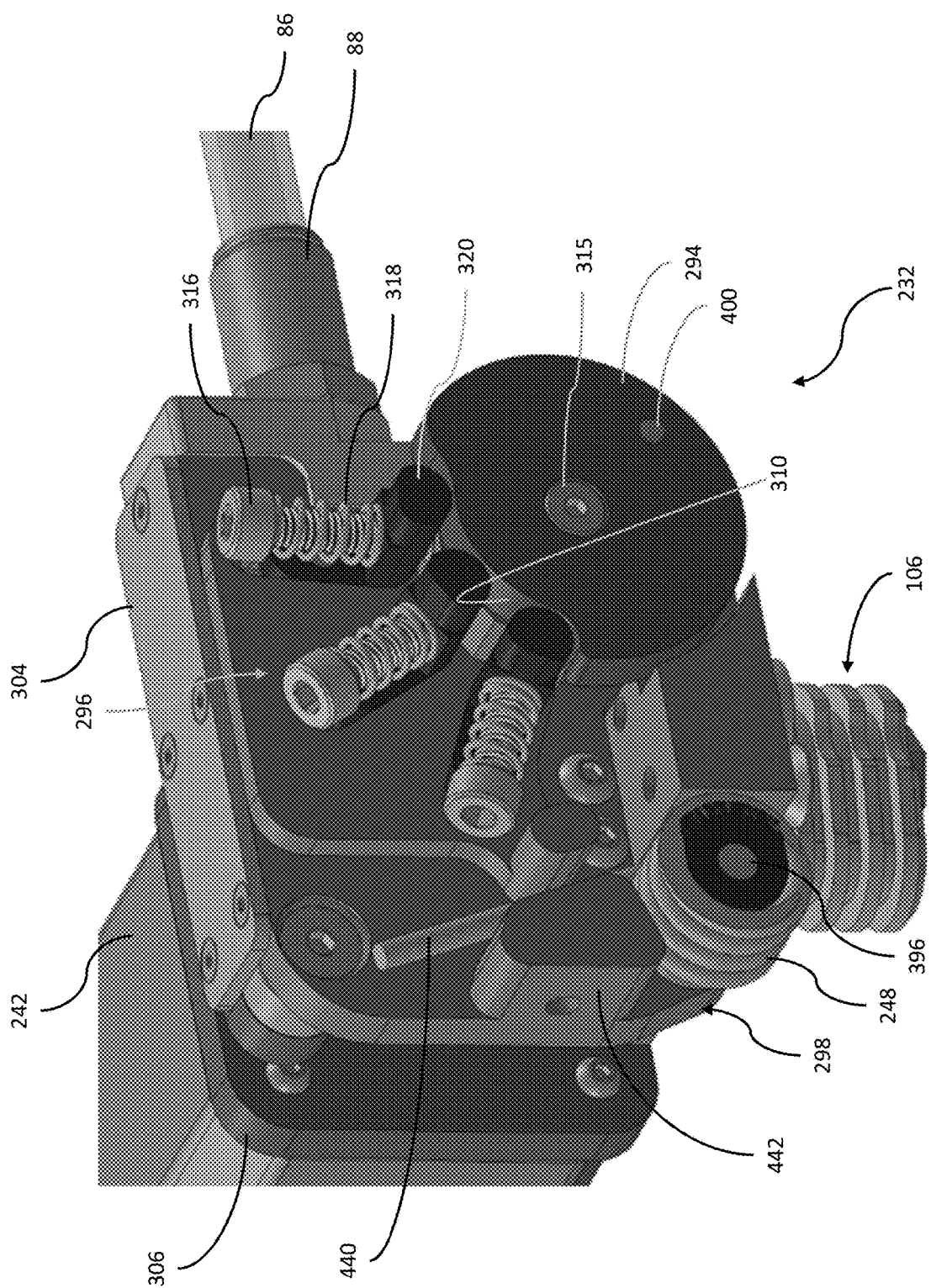
FIG. 23 is a perspective view, partly in section, of the drive assembly of FIG. 22 with certain components removed, showing the drive assembly in an engaged position.

Spring 248 biases lever 66 downwardly into the inactive position shown in FIG. 22. Specifically, one end 436 of spring 248 rests within a groove 438 of lever body 388 and the other end 440 of spring 248 rests against a stop 442 formed on forward drive plate 298. Spring 248 is pre-tensioned such that when positioned as shown, spring 248 applies a biasing force to lever 66 to maintain lever 66 in the inactive position. FIG. 23 is a cross-sectional view of FIG. 22 showing drive assembly 232 (specifically, axle members 320 and drive wheels 300) in the engaged position with lever 66 not shown.

Figure 24:
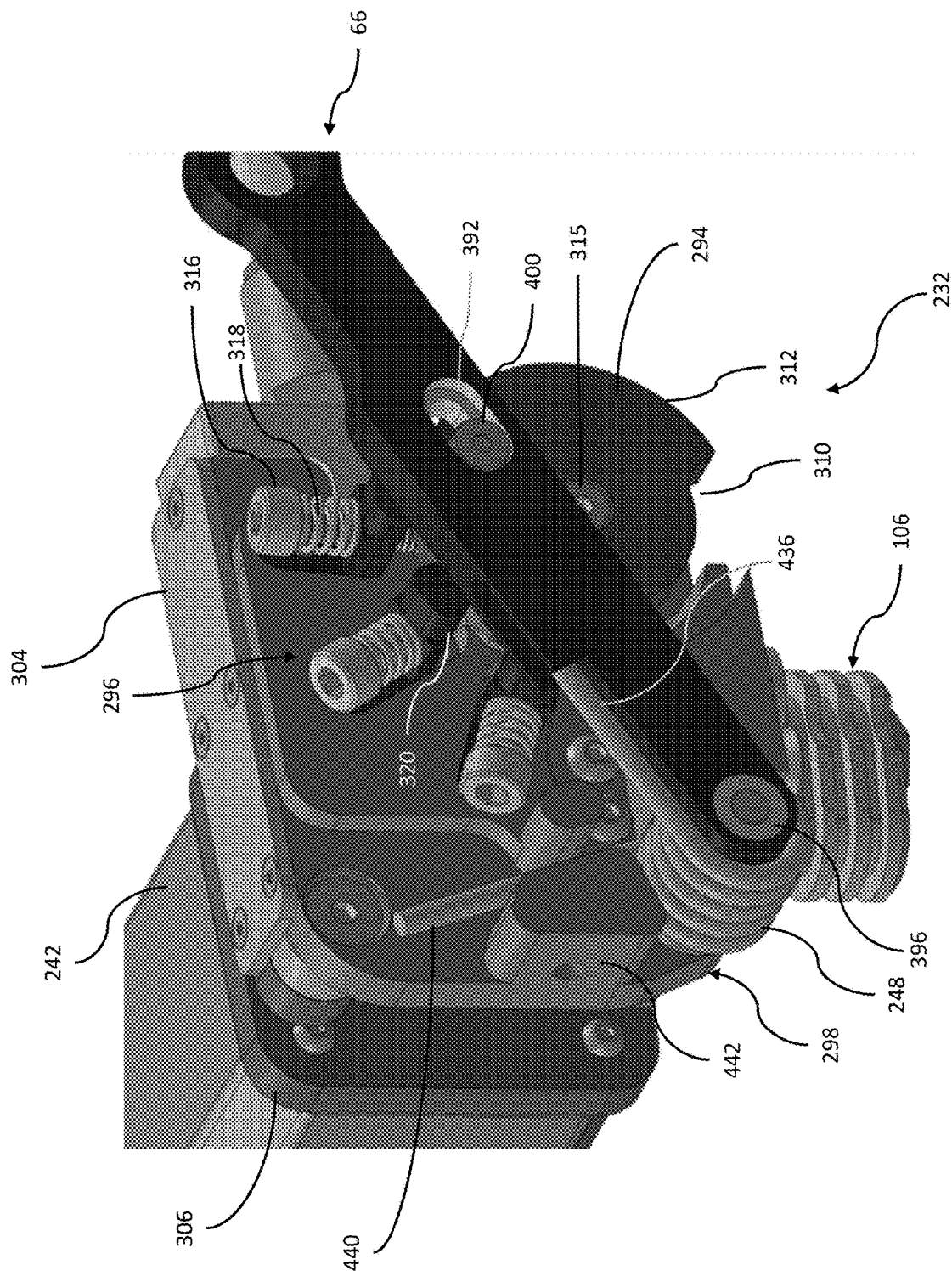
FIG. 24 is a perspective view of the drive assembly of FIG. 22 in a disengaged position.
Figure 25:
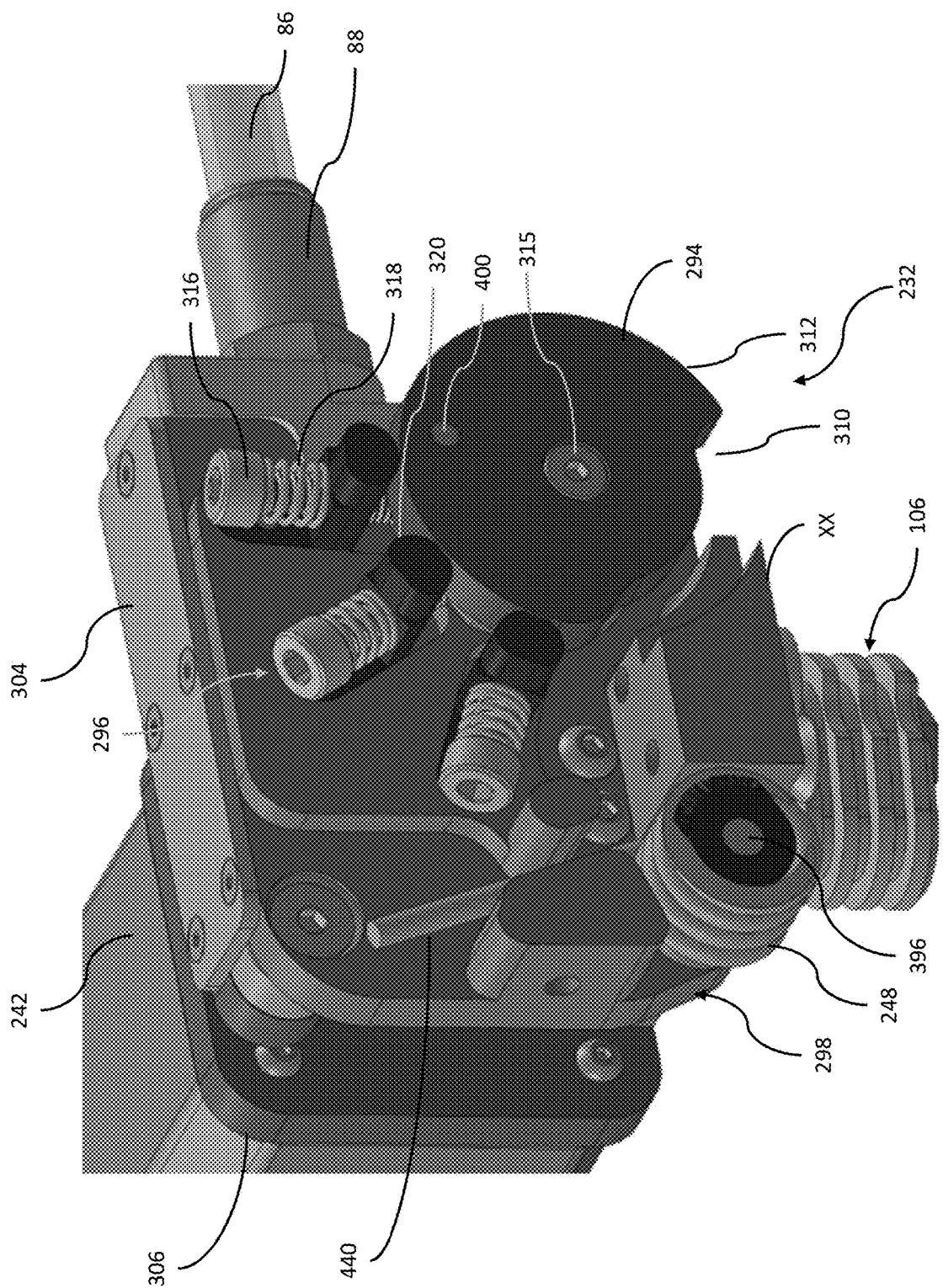
FIG. 25 is a perspective view, partly in section, of the drive assembly of FIG. 24 with certain components removed.

Referring now to FIGS. 24 and 25, axle members 320 of drive assembly 232 are shown in the disengaged position. As shown, lever 66 has been raised upwardly to the active position (this may be accomplished manually) against the biasing force of spring 248. When lever 66 is raised to the active position, lever 66 pivots about pivot pin 396 and slot 392 moves guide pin 400 of cam 294 upwardly. Guide pin 400 moves within slot 392 as lever 66 is moved upwardly, and causes cam 294 to rotate in a counter-clockwise direction to the position shown in FIGS. 24 and 25. As cam 294 rotates, axle members 320 are urged upwardly (against the biasing force of springs 318) onto outer edge 312 of cam 294 as recessed surface 310 rotates away from axle members 320. This causes drive wheels 300 to move upwardly to a disengaged position such that drive wheels 300 are spaced apart from drive disc 374 and no longer compress the filament against drive disc 374. Consequently, when drive wheels 300 are in the disengaged position, the filament may be removed by pulling the exposed filament from drive assembly 232 through filament tube 86. FIG. 25 is a cross-sectional view of FIG. 24 showing axle members 320 of drive assembly 232 in the disengaged position with lever 66 not shown.

Figure 26:
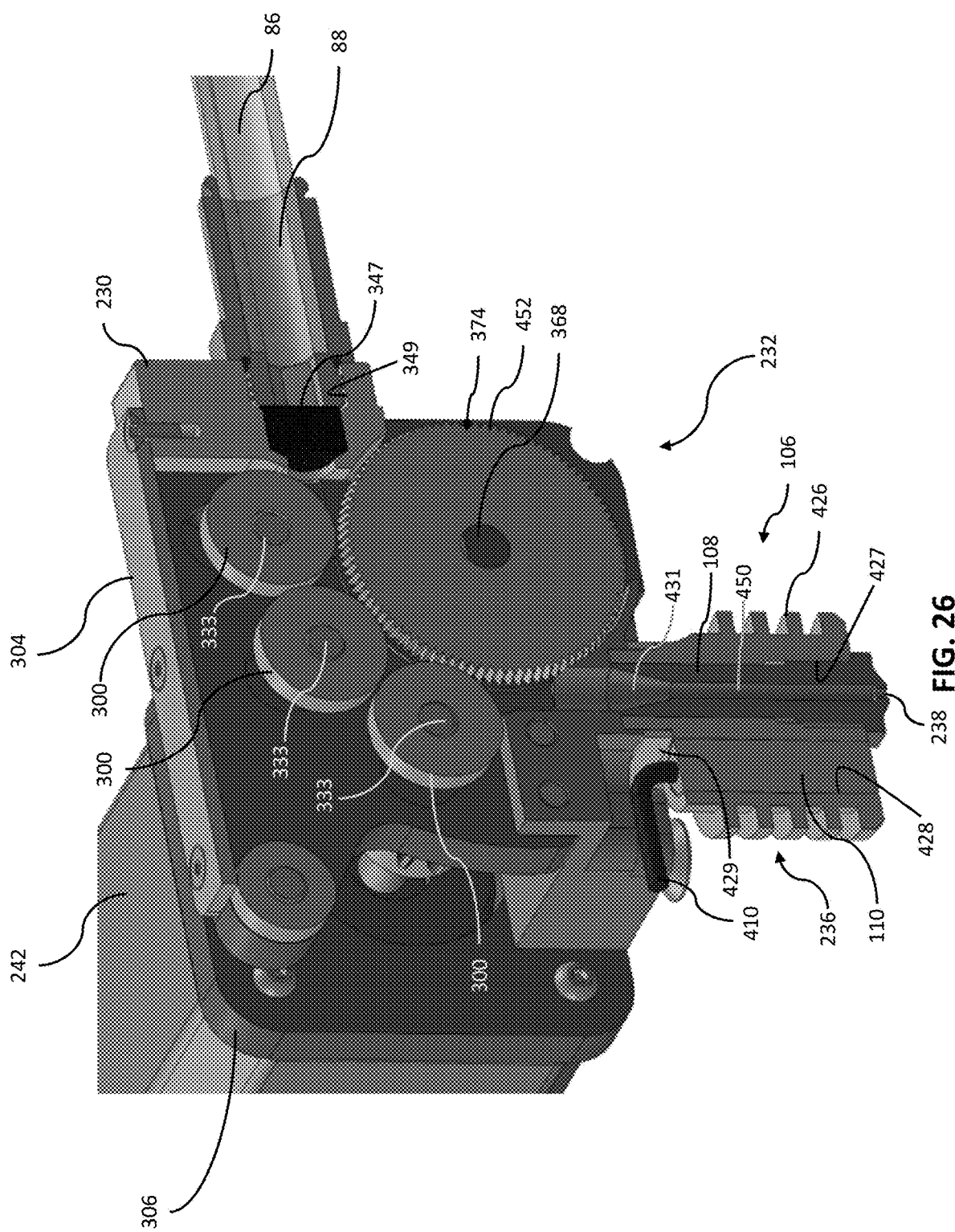
FIG. 26 is a cross-sectional perspective view of the drive assembly of FIG. 22.

Referring now to FIG. 26, drive wheels 300 of drive assembly 232 is shown in the engaged position. Lever 66, cam 294, wheel drive assemblies 296, spring 248 and forward drive plate 298 are not shown. As described above, when lever 66 is in the downward, inactive position to which it is biased by spring 248, cam 294 is rotated such that recessed surface 310 is positioned below axle members 320 which are biased downwardly by springs 318. As such, drive wheels 300, which move with axle members 320 and rotate on bolts 333, are in their lowermost engaged position and thereby urge filament (not shown) against drive disc 374. As drive disc 374 rotates in the counter-clockwise direction with follower gear 366 (FIG. 21), which is driven by drive gear 362 (FIG. 21) connected to stepper motor 242, the filament, compressed against drive disc 374 by drive wheels 300 (in one embodiment, against teeth 452 of drive disc 374), is drawn into drive assembly 232 from filament tube 86, through connector 88, through opening 349 of inlet bracket 230 and through bushing 347. The filament is drawn around drive disc 374 and delivered by drive disc 374 and drive wheels 300 into a longitudinal opening 450 of nozzle 108. It should be understood that in certain embodiments, the filament may be provided to tool 50 from a filament spool or other container in a first direction and discharged from nozzle 108 in a second direction that is substantially perpendicular to the first direction. As should be understood from the foregoing, the structure of tool 50 permits entry of the filament into the side of tool 50 rather than the top. While this configuration requires filament to travel through a turn within drive assembly 232 of approximately 90 degrees, it also permits tool 50 to be more compact, particularly in the direction of the z-axis of workspace 18. This permits greater travel of tool 50 along the z-axis in workspace 18 (i.e., permits a higher workspace 18).

As the filament is delivered into nozzle 108, it is heated by heating element 110 which is positioned in heating element opening 428 of nozzle mount 236. Heat is conducted through nozzle mount 236 from heating element 110 to nozzle 108, causing the filament to melt and flow from outlet opening 238 of nozzle 108. In this manner, heat transferred from heating element 110 converts the filament into extruded material which is deposited from nozzle 1087 to form a part. Heat is dissipated from nozzle mount 236 by cooling fins 426. Delivery assembly 106 also includes a ceramic spacer 429 positioned at the upper end of nozzle mount 236. Ceramic spacer 429 inhibits heat transfer from heating element 110 to a tapered inlet portion 431 of longitudinal opening 450 of nozzle 108 to ensure that the filament as it enters longitudinal opening 450 remains solid.

Figure 27:
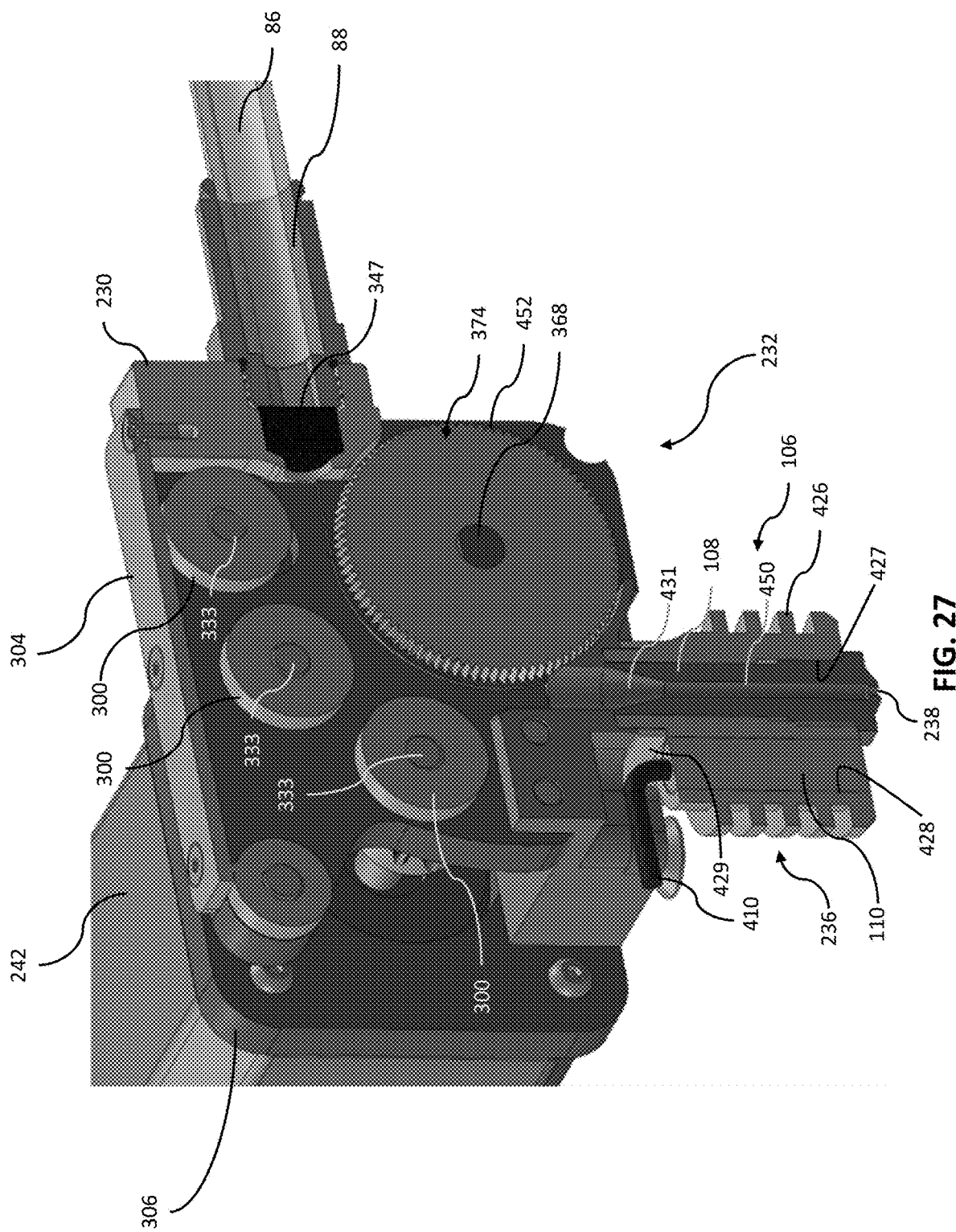
FIG. 27 is a cross-sectional perspective view of the drive assembly of FIG. 24.

FIG. 27 is similar to FIG. 26 except drive assembly 232 is in the disengaged position. Drive wheels 300 have been moved upwardly through operation of lever 66, cam 294 and axle members 320 as described above. As shown, drive wheels 300 are spaced apart from drive disc 374 so that the filament may be removed from drive assembly 232.

Figure 28:
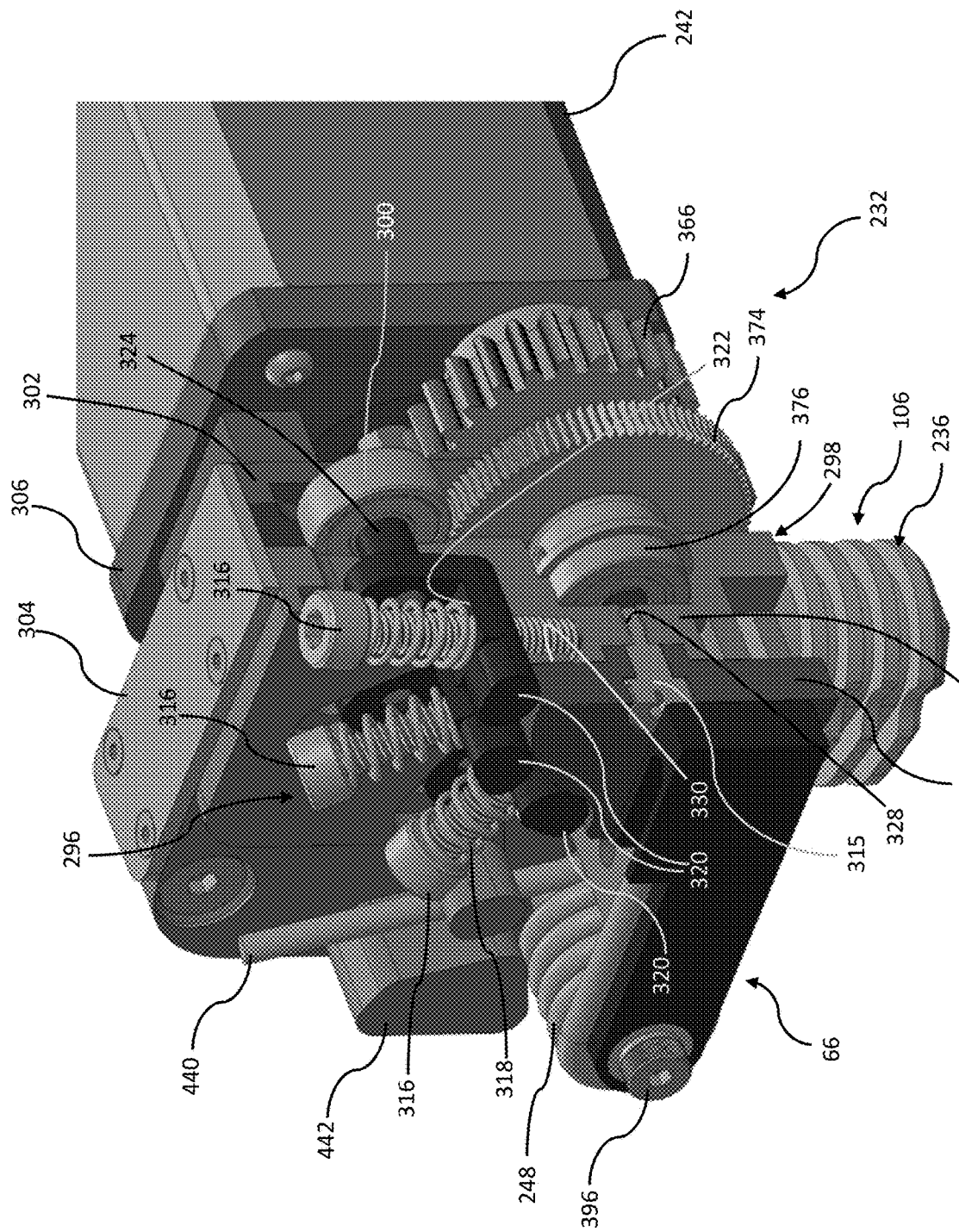
FIGS. 28 and 29 are perspective views, partly in section, of the drive assembly of FIG. 20.
Figure 29:
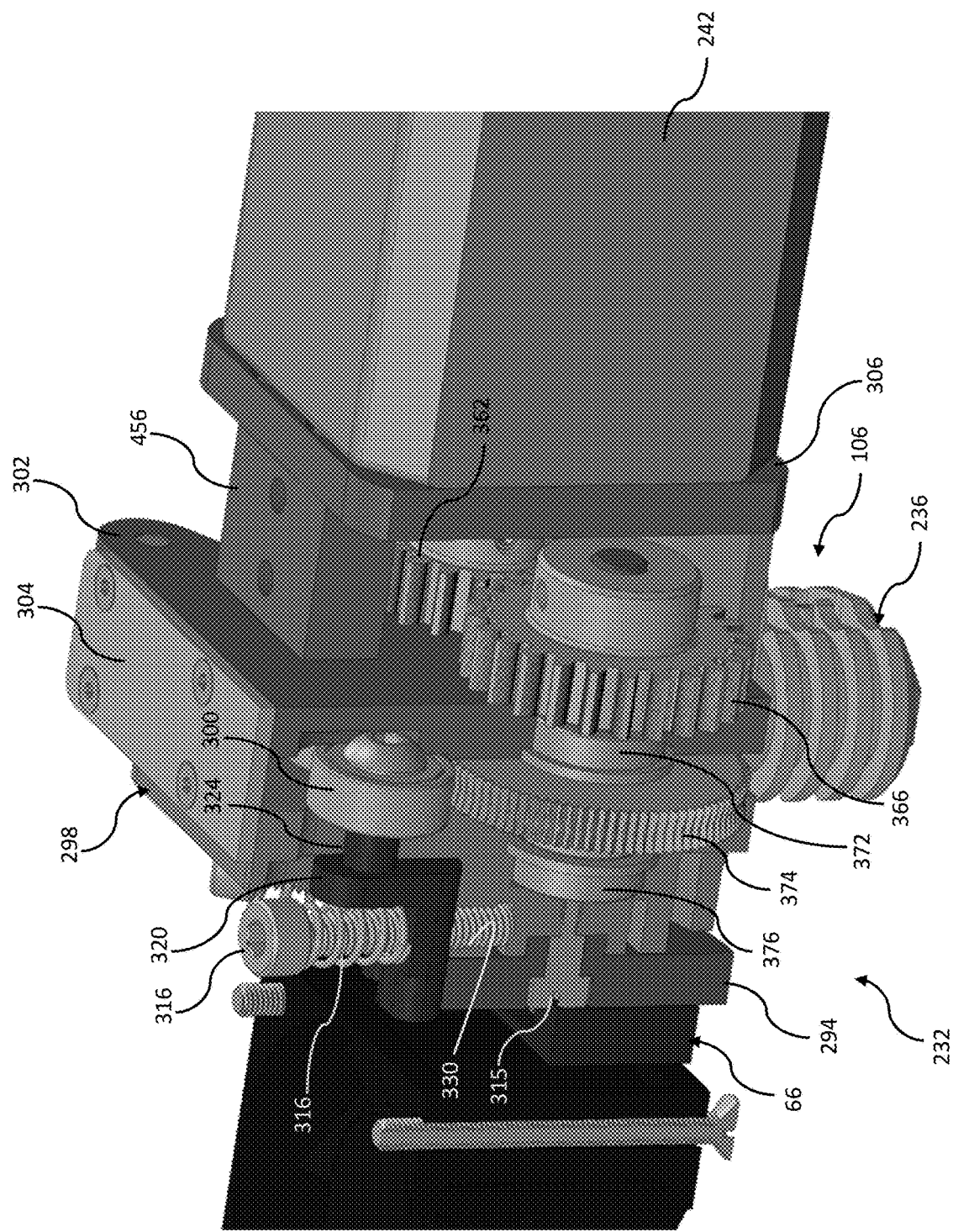

FIGS. 28 and 29 are perspective views of drive assembly 232 with portions of lever 66, cam 294, forward drive plate 298, connecting plate 304 and rearward drive plate 302 cut away. In these views, lever 66 is in its downward position and drive assembly 232 is consequently in the engaged position. Pivot bolt 315 is shown extending through cam 294 and threaded into central opening 328 of cam boss 326. One of the three bolts 316 of wheel drive assemblies 296 is shown extending into a threaded opening 330 of cam boss 326. This shows how spring 318 of wheel drive assembly 296 biases axle member 320 downwardly as one end of spring 318 engages shoulder opening 322 of axle member 320 and the other end of spring 318 engages the head of bolt 316. Bolts 316 may be threaded into threaded openings 330 by a desired amount to set the biasing force springs 318 apply to axle members 320, which thereby sets the force drive wheels 300 apply to the filament that is between drive wheels 300 and drive disc 374. A drive wheel 300 is shown mounted on axle 324 of axle member 320. FIGS. 28 and 29 also show bearing 376 and bearing 372 in which drive disc 374 rotates during operation. FIG. 29 best shows drive gear 362 driven by stepper motor 242 meshing with follower gear 366, which drives rotation of drive disc 374. As should be understood from the foregoing, stepper motor 242 is controlled by controller 12.

Figure 30:
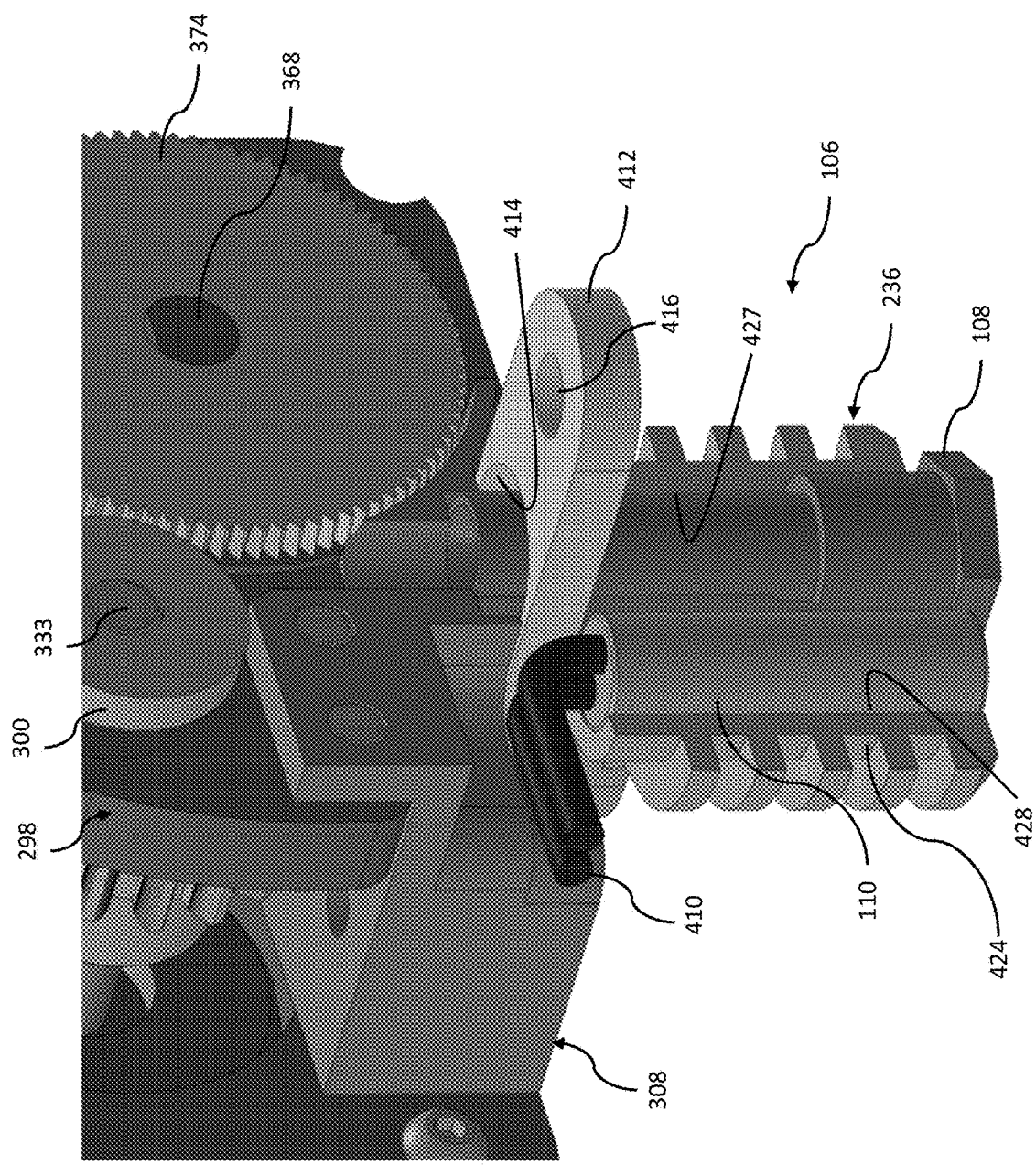
FIG. 30 is a perspective view, partly in section, of a delivery assembly according to the present disclosure.

Referring now to FIGS. 30 and 31, details of delivery assembly 106 are shown. Conductors 410 are connected to heating element 110 and provided power and control signals by controller 12. Heating element 110 is shown in heating element opening 428 of delivery body 424 of nozzle mount 236. Nozzle 108 is positioned within nozzle opening 427 of nozzle mount 236 and extends through delivery opening 414 of delivery bracket 412. One of mounting holes 416 of delivery bracket 412 is also shown. FIG. 31 is a side view of delivery assembly 106 showing a thermistor 454 installed in nozzle mount 236. Thermistor 454 provides temperature signals to controller 12 indicating the temperature of heating element 110. Controller 12 uses this information to control the temperature of heating element 110 to ensure that the filament in nozzle 108 is sufficiently hot to flow through outlet opening 238.

Figure 32:
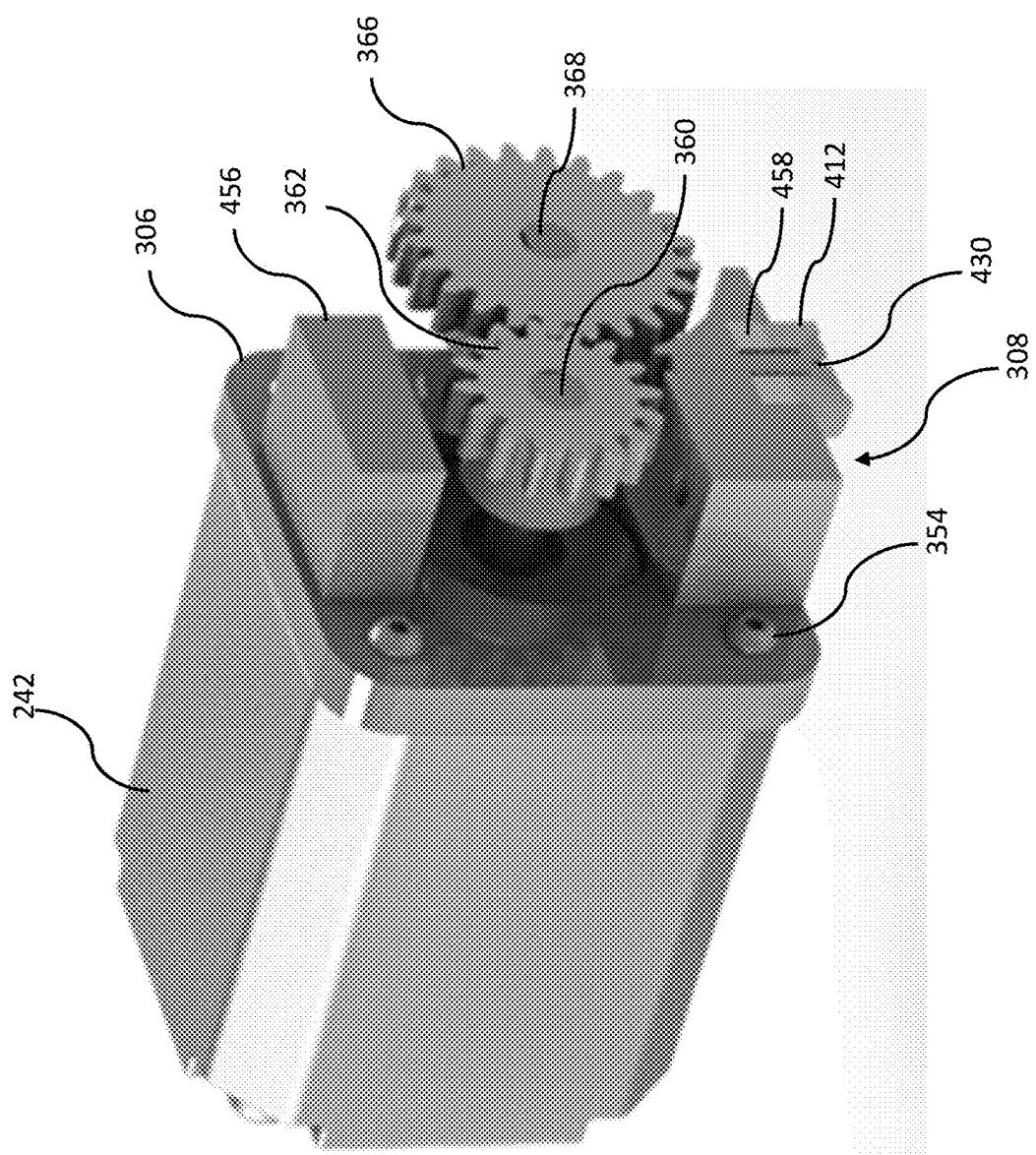
FIG. 32 is a perspective view of portions of the drive assembly of FIG. 20.

Referring now to FIG. 32, a portion of drive assembly 232 is shown to illustrate the interaction between drive gear 362 and follower gear 366. As shown, drive gear 362 is attached to drive shaft 360, which is rotated by motor 242. As drive gear 362 rotates in one direction, follower gear 366 rotates in the opposite direction, thereby causing shaft 368 to rotate, which powers rotation of drive disc 374 in the manner described above. Motor mount 306 is shown coupled to motor 242, mounting block 456 of rearward drive plate 302 (FIG. 21) and delivery mount 308. Portions of rearward drive plate 302 and delivery mount 308 are cut away to show gears 362, 366. A section of delivery bracket 412 is shown connected to delivery mount 308 by screw 430. Also, a section of a ceramic spacer 458 is shown disposed between delivery bracket 412 and delivery mount 308. Spacer 458 inhibits heat transfer from delivery bracket 412 (which is in contact with nozzle mount 236) to delivery mount 308 and the rest of drive assembly 232.

Figure 33:
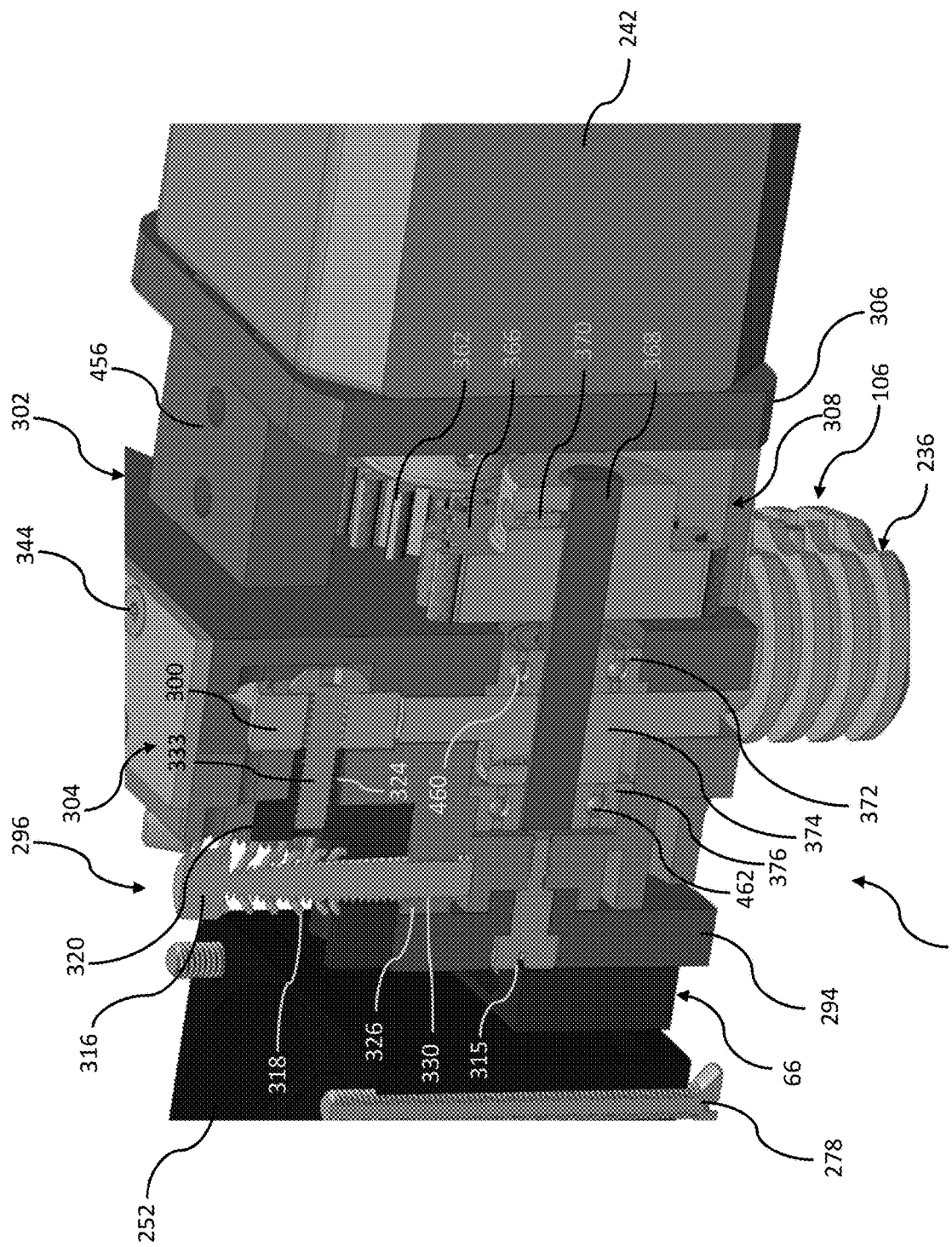
FIG. 33 is perspective view, partly in section, of the drive assembly of FIG. 20.

FIG. 33 provides a different partial cross-sectional view of drive assembly 232. Stepper motor 242 is shown coupled to motor mount 306, which in turn is coupled to mounting block 456 of rearward drive plate 302 and delivery mount 308. Drive gear 362 is shown meshing with follower gear 366, which is attached to shaft 368 by set screw 370. Shaft 368 extends through rearward drive plate 302, bearing 372, drive disc 374 and bearing 376. A plurality of ball bearings 460 are disposed in bearing 372, and another plurality of ball bearings 462 are disposed in bearing 376. A cross-sectioned drive wheel 300 is shown mounted for rotation on bolt 333, which extends into axle 324 of axle member 320. One bolt 316 of wheel drive assembly 296 is shown extending through spring 318 and axle member 320, and into threaded opening 330 formed in cam boss 326. Axle member 320 is shown biased downwardly by spring 318 against cam 294, which may rotate between an engaged and disengaged position on pivot bolt 315 by movement of lever 66 in the manner described above.

Figure 34:
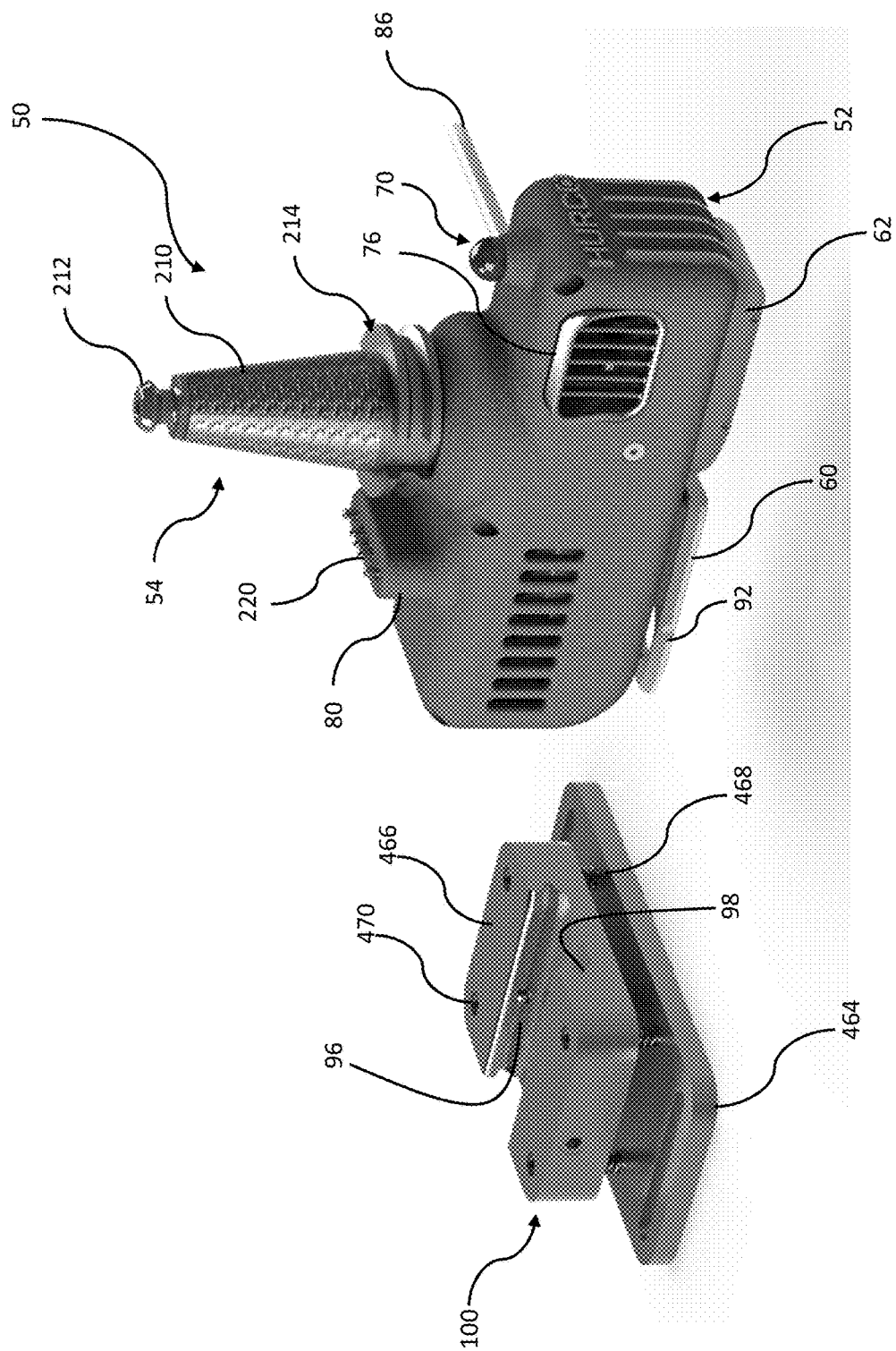
FIG. 34 is a perspective view of the tool of FIG. 3 depicted with a tool picker base according to an embodiment of the present disclosure.
Figure 35:
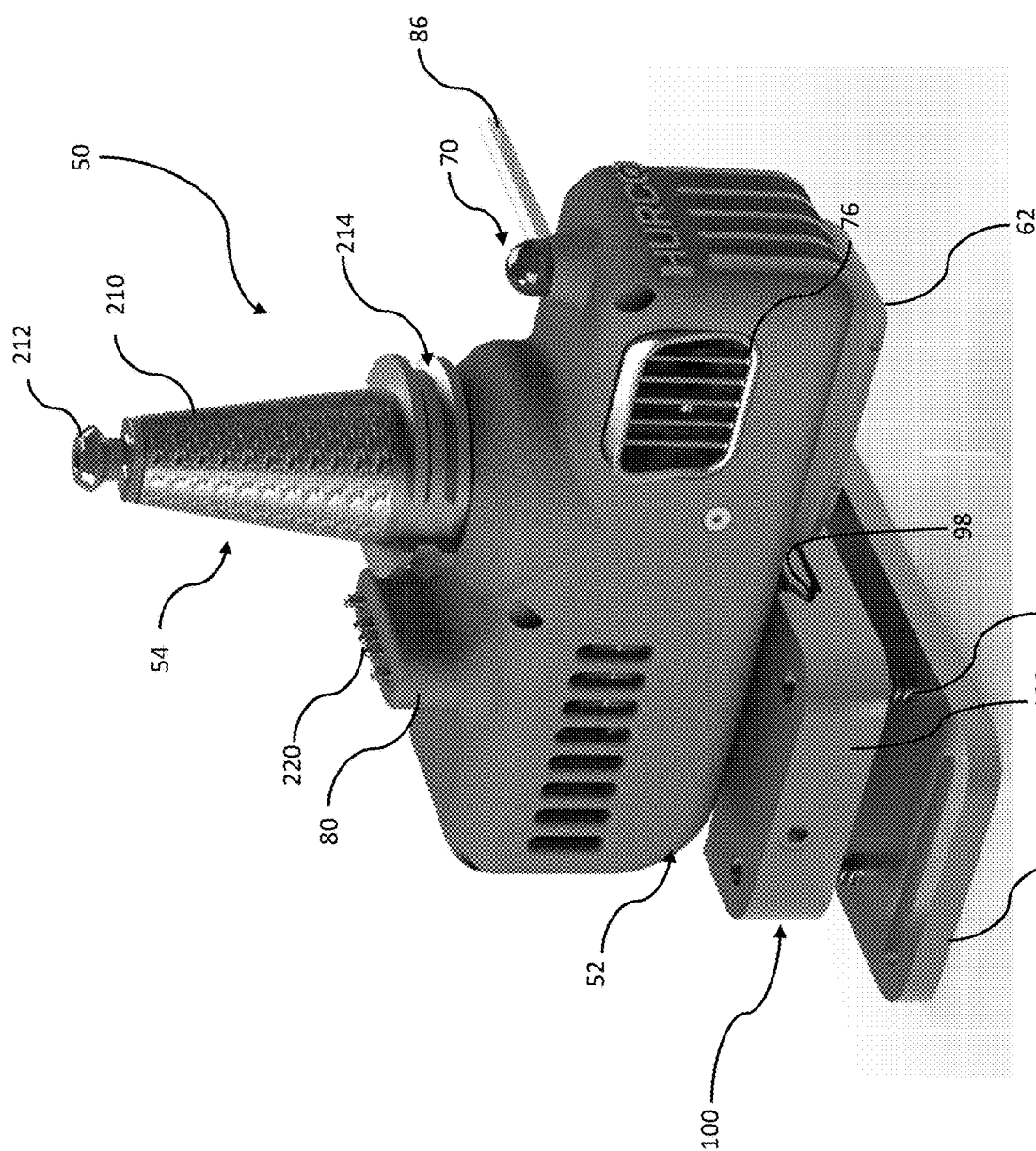
FIG. 35 is a perspective view of the tool of FIG. 3 mounted to the tool picker base of FIG. 34.

FIGS. 34 and 35 show the manner in which tool 50 may be mounted to a tool picker base 100. As explained above with reference to FIG. 6, mount 60 is attached to housing 52 of tool 50 and includes a pair of side edges 92, 94 that are spaced apart to correspond to channels 96, 98 formed in tool picker base 100. In this manner, tool 50 may be mounted to base 100 as shown in FIG. 35 and automatically coupled to spindle 30 in a conventional manner. Tool picker base 100 includes a base plate 464 and a body 466 attached to base plate 464 by screws 470 which extend through stand-offs 468 disposed between base plate 464 and body 466. Channels 96, 98 are formed in body 466 as shown.

Figure 36:
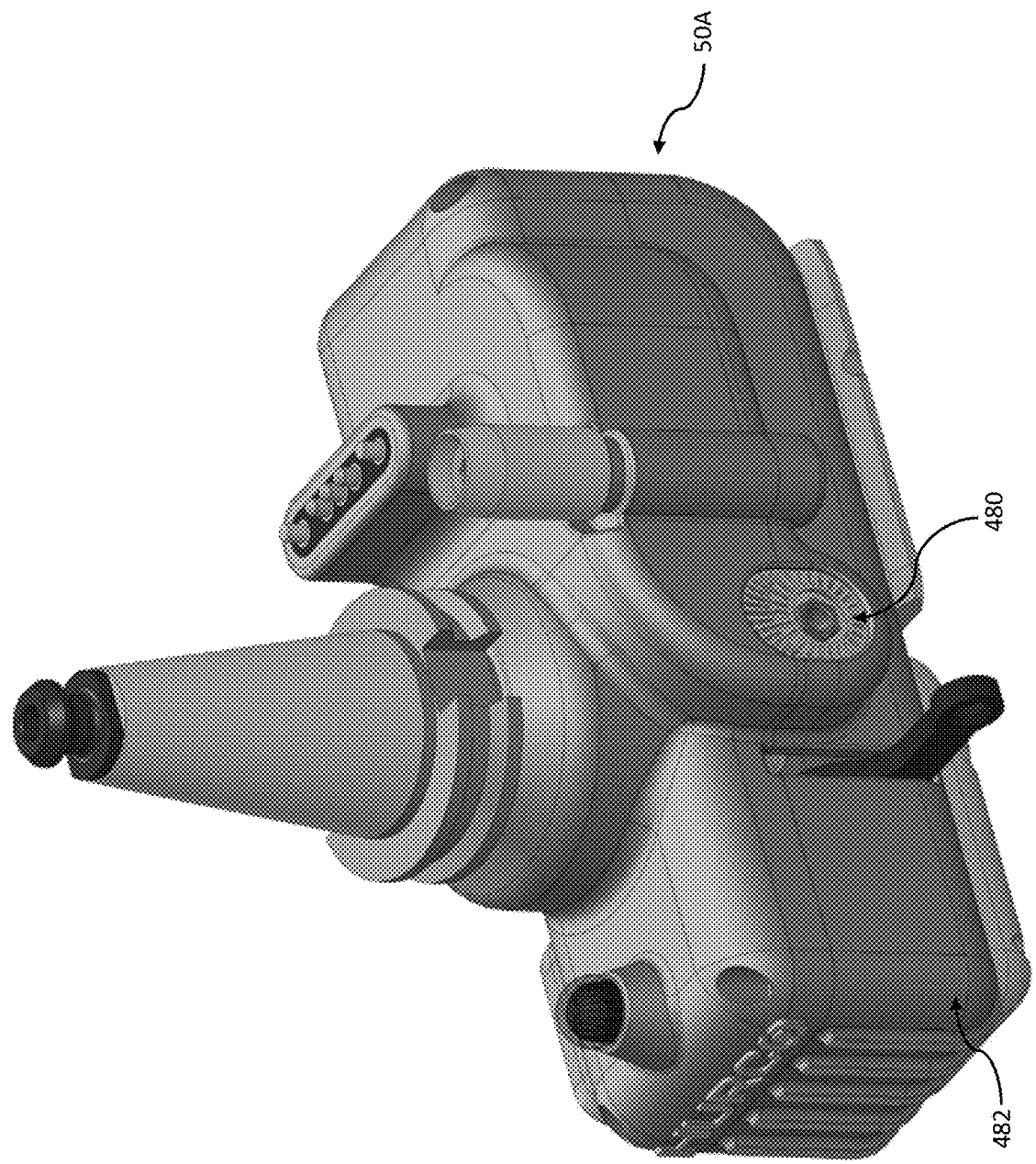
FIG. 36 is a perspective view of another embodiment of an additive manufacturing tool according to the present disclosure having a heated inlet assembly.
Figure 37:
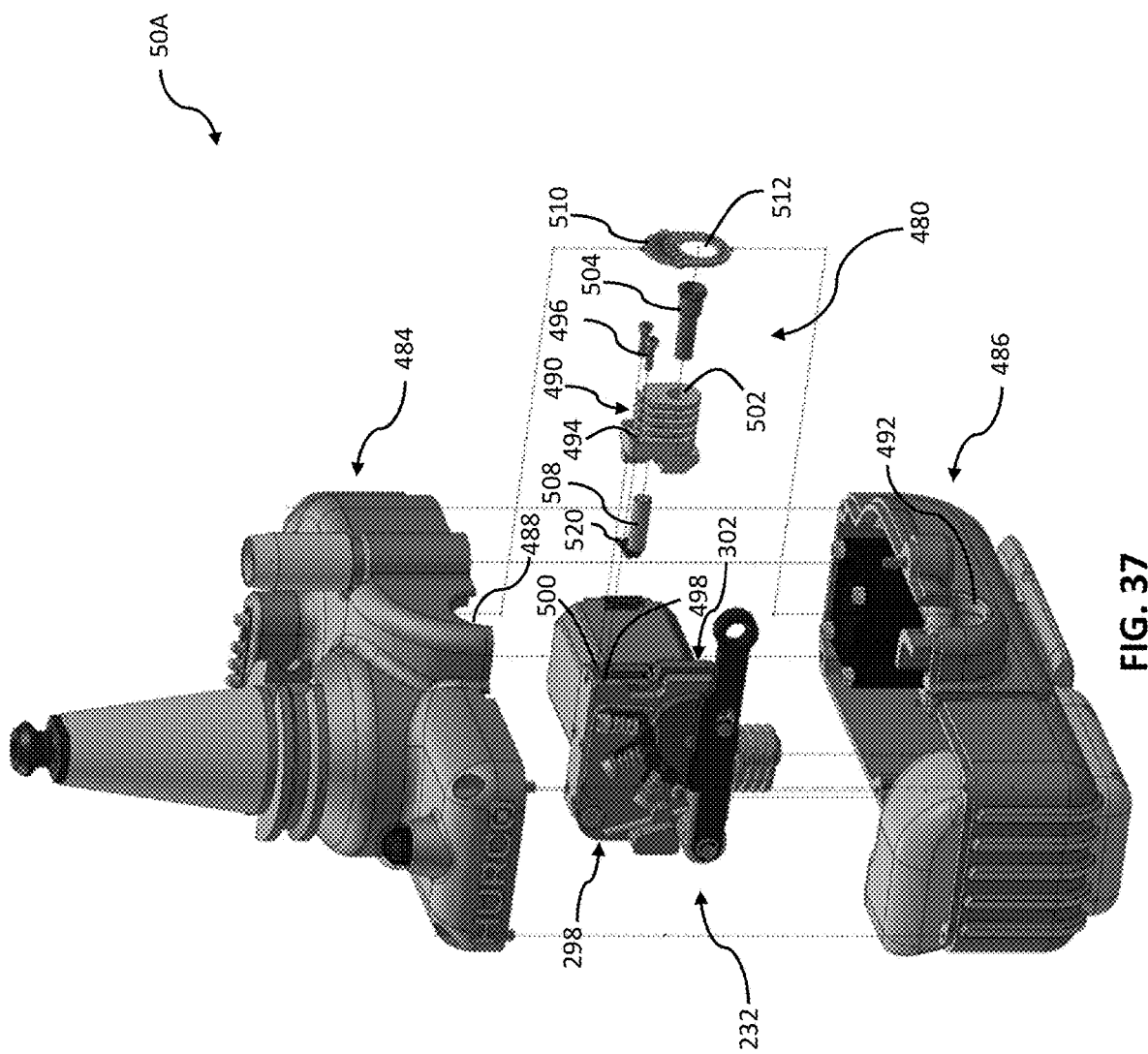
FIG. 37 is an exploded perspective view of the tool of FIG. 36.
Figure 38:
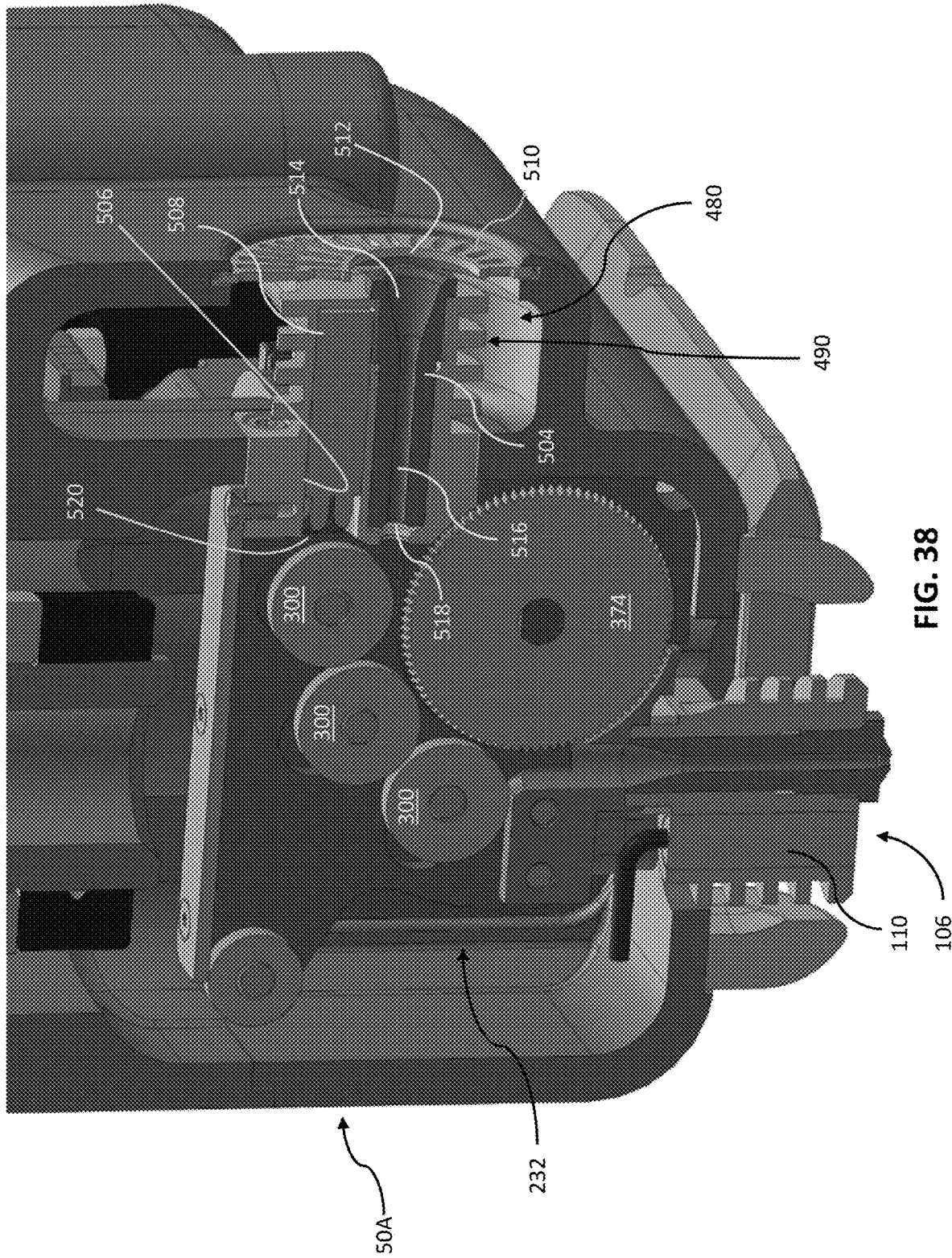
FIG. 38 is a perspective cross-sectional view of a portion of the tool of FIG. 36.

Referring now to FIGS. 36-38, an alternative embodiment of tool 50 (referred to as tool 50A) is shown having a heated inlet assembly 480. As shown in FIG. 37, housing 482 of tool 50A includes an upper portion 484 and a lower portion 486. Drive assembly 232 is substantially similar to the embodiment described above. Upper portion 484 includes a cutout 488 sized to receive a portion of an inlet nozzle mount 490 and lower portion 486 includes a cutout 492 sized to receive a portion of inlet nozzle mount 490. Inlet nozzle mount 490 includes openings 494 which receive screws 496 for attaching inlet nozzle mount 490 to threaded openings 498, 500 of forward drive plate 298 and rearward drive plate 302, respectively. Inlet nozzle mount 490 also includes a central opening 502 sized to receive an inlet nozzle 504. As best shown in FIG. 38, inlet nozzle mount 490 also includes a heating element bore 506 sized to receive an inlet heating element 508. Finally, heated inlet assembly 480 also includes a cover plate 510 having a central opening 512 that permits filament to pass through cover plate 510 into inlet nozzle 504.

In operation and referring to FIG. 38, filament is fed from a filament source (not shown) through central opening 512 of cover plate 510. The filament is fed into a tapered opening 514 of inlet nozzle 504 and through a longitudinal opening 516 of inlet nozzle 504. The filament is pushed through outlet 518 of inlet nozzle 504 and between drive disc 374 and drive wheels 300. Power is supplied to conductors 520 of inlet heating element 508 and heat is transferred through inlet nozzle mount 490 and inlet nozzle 504 to the filament. This heat transfer slightly pre-heats the incoming filament which makes the filament more flexible, thereby reducing the likelihood that the filament will crack as it travels through the 90 degree turn in drive assembly 232 to delivery assembly 106. Moreover, the pre-heating softens the filament which allows drive disc 374 to better grip the filament. Finally, the pre-heating provided by heated inlet assembly 480 reduces the temperature differential between the filament and heating element 110 of delivery assembly 106. This may increase the throughput rate for the filament as less energy is required to heat the filament into molten form as it flows through delivery assembly 106.

It should further be understood that the tools described herein accommodate different sized filaments. For example, depending upon the embodiment, inlet nozzle 504 and/or nozzle 108 may be replaced with nozzles configured to accommodate filaments of different diameters, such as between 1.75 mm and 5 mm, and any size in between.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An additive manufacturing tool configured to couple to a spindle of a computer numerical control ("CNC") machine, the tool comprising:
   a plurality of drive wheels being movable between an engaged position wherein the plurality of drive wheels compress filament from a filament source against a drive disc and a disengaged position wherein the plurality of drive wheels are spaced apart from the filament;
   a delivery assembly including a heating element and a nozzle having an outlet opening; and
   a lever movable between an inactive position wherein a plurality of axle members of the plurality of drive wheels engage a cam at a first location and an active position wherein the plurality of axle members engage the cam at a second location;

wherein when the plurality of drive wheels are in the engaged position and the drive disc is rotated, the filament is drawn into the tool from the filament source and routed around the drive disc to the nozzle, where heat transferred from the heating element to the nozzle melts the filament so that the filament flows through the outlet opening.

2. The additive manufacturing tool of claim 1, wherein the filament enters the tool in a first direction and passes through the nozzle in a second direction, the second direction being substantially perpendicular to the first direction.

3. The additive manufacturing tool of claim 2, further comprising a material inlet assembly including a filament tube that routes filament into the tool in the first direction.

4. The additive manufacturing tool of claim 1, wherein the plurality of drive wheels are mounted to the plurality of axle members, the plurality of axle members being movable between a lowered position which places the drive wheels in the engaged position and a raised position which places the drive wheels in the disengaged position.

5. The additive manufacturing tool of claim 4, wherein when the lever is in the inactive position the plurality of axle members are in the lowered position and engage a recessed surface of the cam and when the lever is in the active position the lever rotates the cam such that the plurality of axle members engage an outer edge of the cam, thereby moving the plurality of axle members into the raised position and the plurality of drive wheels into the disengaged position.

6. The additive manufacturing tool of claim 5, further comprising a guide pin that extends through a slot in the lever and into the cam, wherein movement of the lever toward the active position moves the slot relative to the cam and causes the guide pin to rotate the cam.

7. The additive manufacturing tool of claim 5, further comprising a forward drive plate having a cam boss, a plurality of bolts each extending through one of the plurality of axle members and threaded into a threaded opening in the cam boss, and a plurality of springs each disposed between one of the plurality of bolts and one of the plurality of axle members to bias the one of the plurality of axle members toward the lowered position.

8. The additive manufacturing tool of claim 5, further comprising a spring coupled to the lever to bias the lever toward the inactive position.

9. The additive manufacturing tool of claim 1, further comprising a stepper motor, a drive gear coupled to the stepper motor, a follower gear that meshes with the drive gear, and a shaft coupled to the follower gear for rotation therewith, the drive disc being coupled to the shaft, wherein operation of the stepper motor causes rotation of the drive gear in a first direction, which causes rotation of the follower gear, the shaft and the drive disc in a second direction that is opposite the first direction.

10. The additive manufacturing tool of claim 1, further including a tool holder configured to couple to a tool coupler of the spindle, and an anti-rotate pin configured to couple to a stop block attached to the spindle to prevent rotation of the tool when the spindle rotates.

11. The additive manufacturing tool of claim 1, further including a dock connector that mates with a connector coupled to the spindle to provide power and control signals to the tool.

12. The additive manufacturing tool of claim 1, further comprising a pair of bearings, the drive disc rotating on a shaft that is supported by the pair of bearings.

13. The additive manufacturing tool of claim 1, further comprising a heated inlet assembly including an inlet nozzle configured to receive filament from the filament source and an inlet heating element disposed adjacent the inlet nozzle to provide heat to the inlet nozzle and thereby preheat the filament before the filament is routed around the drive disc.

14. A system for additive manufacture of a part, comprising:
a computer numerical control ("CNC") machine, wherein the CNC machine includes a spindle and a controller;
an additive manufacturing tool that receives filament and provides extruded material to form a part in a workspace of the CNC machine, the additive manufacturing tool including:
a plurality of wheel drive assemblies each including an axle member, a spring and a bolt extending through the spring and the axle member and into a threaded opening in a cam boss,
a plurality of drive wheels coupled to the plurality of wheel drive assemblies for movement between an engaged position and a disengaged position wherein the plurality of drive wheels are spaced apart from the filament,
a motor-driven drive disc, and
a delivery assembly including a heating element;
wherein the additive manufacturing tool is coupled to the spindle and controlled by the controller, the controller causing the motor-driven drive disc to rotate, which when the plurality of drive wheels are in the engaged position, draws the filament into the additive manufacturing tool, around the motor-driven drive disc and into the delivery assembly where heat transferred from the heating element converts the filament into extruded material deposited from the additive manufacturing tool to form the part.

15. The system of claim 14, wherein when the plurality of drive wheels are in the engaged position, the plurality of drive wheels compress the filament against the drive disc.

16. The system of claim 14, wherein the filament enters the tool in a first direction and passes through a nozzle of the delivery assembly in a second direction, the second direction being substantially perpendicular to the first direction.

17. The system of claim 16, wherein the additive manufacturing tool further comprises a material inlet assembly including a filament tube that routes filament into the tool in the first direction.

18. The system of claim 14, wherein each of the plurality drive wheel assemblies includes an axle member coupled to one of the plurality of drive wheels, each axle member being movable between a lowered position which places the corresponding drive wheel in the engaged position and a raised position which places the corresponding drive wheel in the disengaged position.

19. The system of claim 18, wherein the additive manufacturing tool further comprises a lever coupled to a cam, the lever being movable from an inactive position wherein the plurality of axle members are in the lowered position and engage a recessed surface of the cam and an active position wherein the lever rotates the cam such that the plurality of axle members engage an outer edge of the cam, thereby moving the plurality of axle members into the raised position and the plurality of drive wheels into the disengaged position.

20. The system of claim 19, wherein the additive manufacturing tool further comprises a guide pin that extends through a slot in the lever and into the cam, wherein movement of the lever toward the active position moves the slot relative to the cam and causes the guide pin to rotate the cam.

21. The system of claim 19, wherein the additive manufacturing tool further comprises a spring coupled to the lever to bias the lever toward the inactive position.

22. The system of claim 14, wherein the spring is disposed between the bolt and the axle member to bias the axle member toward a lowered position.

23. The system of claim 14, wherein the additive manufacturing tool further comprises a stepper motor, a drive gear coupled to the stepper motor, a follower gear that meshes with the drive gear, and a shaft coupled to the follower gear for rotation therewith, the drive disc being coupled to the shaft, and wherein the controller controls operation of the stepper motor to rotate the drive gear, the follower gear, the shaft and the motor-driven drive disc.

24. The system of claim 14, wherein the additive manufacturing tool further comprises a tool holder configured to couple to a tool coupler of the spindle, and an anti-rotate pin configured to couple to a stop block attached to the spindle to prevent rotation of the tool when the spindle rotates.

25. The system of claim 14, wherein the additive manufacturing tool further comprises a heated inlet assembly including an inlet nozzle configured to receive filament from a filament source and an inlet heating element disposed adjacent the inlet nozzle to provide heat to the inlet nozzle and thereby preheat the filament before the filament is routed around the motor-driven drive disc.

26. An additive manufacturing tool configured to couple to a spindle of a computer numerical control ("CNC") machine, the tool comprising:
  a plurality of drive wheels being movable between an engaged position wherein the plurality of drive wheels compress filament from a filament source against a drive disc and a disengaged position wherein the plurality of drive wheels are spaced apart from the filament;
  a lever movable between an inactive position wherein a plurality of axle members of the plurality of drive wheels engage a cam at a first location and an active position wherein the plurality of axle members engage the cam at a second location;
  a delivery assembly including a heating element and a nozzle having an outlet opening; and
  a heated inlet nozzle configured to provide filament from the filament source to the drive wheels;
  wherein when the plurality of drive wheels are in the engaged position and the drive disc is rotated, the filament is drawn into the tool from the filament source and routed to the nozzle, where heat transferred from the heating element to the nozzle melts the filament so that the filament flows through the outlet opening; and
  wherein the nozzle and the heated inlet nozzle are configured to be replaced with other nozzles and heated inlet nozzles to accommodate filaments of different diameters.

27. An additive manufacturing tool configured to couple to a spindle of a computer numerical control ("CNC") machine, the tool comprising:
  a plurality of drive wheels being movable between an engaged position wherein the plurality of drive wheels compress filament from a filament source against a drive disc and a disengaged position wherein the plurality of drive wheels are spaced apart from the filament;
  a delivery assembly including a heating element and a nozzle having an outlet opening;
  a plurality of axle members on which are mounted the plurality of drive wheels, the plurality of axle members being movable between a lowered position which places the drive wheels in the engaged position and a raised position which places the drive wheels in the disengaged position; and
  a lever coupled to a cam, the lever being movable from an inactive position wherein the plurality of axle members are in the lowered position and engage a recessed surface of the cam and an active position wherein the lever rotates the cam such that the plurality of axle members engage an outer edge of the cam, thereby moving the plurality of axle members into the raised position and the plurality of drive wheels into the disengaged position;
  wherein when the plurality of drive wheels are in the engaged position and the drive disc is rotated, the filament is drawn into the tool from the filament source and routed around the drive disc to the nozzle, where heat transferred from the heating element to the nozzle melts the filament so that the filament flows through the outlet opening.

28. The additive manufacturing tool of claim 27, further comprising a guide pin that extends through a slot in the lever and into the cam, wherein movement of the lever toward the active position moves the slot relative to the cam and causes the guide pin to rotate the cam.

29. The additive manufacturing tool of claim 27, further comprising a forward drive plate having a cam boss, a plurality of bolts each extending through one of the plurality of axle members and threaded into a threaded opening in the cam boss, and a plurality of springs each disposed between one of the plurality of bolts and one of the plurality of axle members to bias the one of the plurality of axle members toward the lowered position.

30. The additive manufacturing tool of claim 27, further comprising a spring coupled to the lever to bias the lever toward the inactive position.

31. A system for additive manufacture of a part, comprising:
  a computer numerical control ("CNC") machine, wherein the CNC machine includes a spindle and a controller;
  an additive manufacturing tool that receives filament and provides extruded material to form a part in a workspace of the CNC machine, the additive manufacturing tool including:
    a plurality of wheel drive assemblies,
    a plurality of drive wheels coupled to the plurality of wheel drive assemblies for movement between an engaged position and a disengaged position wherein the plurality of drive wheels are spaced apart from the filament,
    a motor-driven drive disc, and
    a delivery assembly including a heating element;
  wherein the additive manufacturing tool is coupled to the spindle and controlled by the controller, the controller causing the motor-driven drive disc to rotate, which when the plurality of drive wheels are in the engaged position, draws the filament into the additive manufacturing tool, around the motor-driven drive disc and into the delivery assembly where heat transferred from the heating element converts the filament into extruded material deposited from the additive manufacturing tool to form the part;

wherein each of the plurality drive wheel assemblies includes an axle member coupled to one of the plurality of drive wheels, each axle member being movable between a lowered position which places the corresponding drive wheel in the engaged position and a raised position which places the corresponding drive wheel in the disengaged position; and wherein the additive manufacturing tool further comprises a lever coupled to a cam, the lever being movable from an inactive position wherein the plurality of axle members are in the lowered position and engage a recessed surface of the cam and an active position wherein the lever rotates the cam such that the plurality of axle members engage an outer edge of the cam, thereby moving the plurality of axle members into the raised position and the plurality of drive wheels into the disengaged position.

32. The system of claim 31, wherein the additive manufacturing tool further comprises a guide pin that extends through a slot in the lever and into the cam, wherein movement of the lever toward the active position moves the slot relative to the cam and causes the guide pin to rotate the cam.

33. The system of claim 31, wherein the additive manufacturing tool further comprises a spring coupled to the lever to bias the lever toward the inactive position.

* * * * *